US008221224B2

(12) United States Patent
Nguyen et al.

(10) Patent No.: US 8,221,224 B2
(45) Date of Patent: Jul. 17, 2012

(54) METHOD FOR DISTRIBUTING LARGE PAYOUTS WITH MINIMAL INTERRUPTION OF A GAMING SESSION

(75) Inventors: Binh Nguyen, Reno, NV (US); William Brosnan, Reno, NV (US); Craig Paulsen, Reno, NV (US)

(73) Assignee: IGT, Reno, NV (US)

( * ) Notice: Subject to any disclaimer, the term of this patent is extended or adjusted under 35 U.S.C. 154(b) by 1431 days.

(21) Appl. No.: 11/541,060

(22) Filed: Sep. 28, 2006

(65) Prior Publication Data

US 2007/0099696 A1 May 3, 2007

Related U.S. Application Data

(63) Continuation-in-part of application No. 11/266,636, filed on Nov. 3, 2005, which is a continuation of application No. 10/085,779, filed on Feb. 28, 2002, now Pat. No. 6,984,175.

(51) Int. Cl.
*A63F 9/24* (2006.01)
(52) U.S. Cl. ............... 463/25; 463/20; 463/29; 463/30
(58) Field of Classification Search .......... 463/20, 463/25, 29, 30
See application file for complete search history.

(56) References Cited

U.S. PATENT DOCUMENTS

| 4,856,787 | A | 8/1989 | Itkis |
| 5,129,652 | A | 7/1992 | Wilkinson |
| 5,229,764 | A | 7/1993 | Matchett et al. |
| 5,244,207 | A | 9/1993 | Laatikainen |
| 5,265,874 | A | 11/1993 | Dickinson et al. |
| 5,326,104 | A | 7/1994 | Pease et al. |
| 5,382,784 | A | 1/1995 | Eberhardt |
| 5,505,461 | A | 4/1996 | Bell et al. |
| 5,528,248 | A | 6/1996 | Steiner et al. |
| 5,557,086 | A | 9/1996 | Schulze et al. |
| 5,586,936 | A | 12/1996 | Bennett et al. |
| 5,618,045 | A | 4/1997 | Kagan et al. |
| 5,643,086 | A | 7/1997 | Alcorn et al. |
| 5,678,886 | A | 10/1997 | Infanti |
| 5,738,583 | A | 4/1998 | Comas et al. |
| 5,741,183 | A | 4/1998 | Acres et al. |
| 5,759,102 | A | 6/1998 | Pease et al. |
| 5,761,647 | A | 6/1998 | Boushy |
| 5,768,382 | A | 6/1998 | Schneier et al. |
| 5,770,533 | A | 6/1998 | Franchi |

(Continued)

FOREIGN PATENT DOCUMENTS

AU 2002367741 9/2003

(Continued)

OTHER PUBLICATIONS

International Search Report dated Nov. 7, 2005 from related PCT Application No. PCT/US2005/024298 (4 pages).

(Continued)

*Primary Examiner* — Dmitry Suhol
*Assistant Examiner* — Brandon Gray
(74) *Attorney, Agent, or Firm* — Weaver Austin Villeneuve & Sampson LLP

(57) ABSTRACT

Apparatus and methods for administering payouts in gaming machines are disclosed. More particularly, improved techniques for distributing large payouts with minimal interruption of a gaming session at a gaming apparatus are disclosed.

60 Claims, 22 Drawing Sheets

U.S. PATENT DOCUMENTS

| | | |
|---|---|---|
| 5,779,545 A | 7/1998 | Berg et al. |
| 5,779,546 A | 7/1998 | Meissner et al. |
| 5,779,549 A | 7/1998 | Walker et al. |
| 5,795,228 A | 8/1998 | Trumbull et al. |
| 5,797,085 A | 8/1998 | Beuk et al. |
| 5,816,917 A | 10/1998 | Kelmer et al. |
| 5,871,398 A | 2/1999 | Schneier et al. |
| 5,884,271 A | 3/1999 | Pitroda |
| 5,915,023 A | 6/1999 | Bernstein |
| 5,919,091 A | 7/1999 | Bell et al. |
| 5,971,855 A | 10/1999 | Ng |
| 5,999,808 A | 12/1999 | LaDue |
| 6,001,016 A | 12/1999 | Walker et al. |
| 6,003,013 A | 12/1999 | Boushy et al. |
| 6,012,832 A | 1/2000 | Saunders et al. |
| 6,012,983 A | 1/2000 | Walker et al. |
| 6,016,479 A | 1/2000 | Taricani, Jr. |
| 6,019,283 A | 2/2000 | Lucero |
| 6,048,269 A | 4/2000 | Burns et al. |
| 6,093,100 A | 7/2000 | Singer et al. |
| 6,104,815 A | 8/2000 | Alcorn et al. |
| 6,106,396 A | 8/2000 | Alcorn et al. |
| 6,110,041 A | 8/2000 | Walker et al. |
| 6,117,013 A | 9/2000 | Eiba |
| 6,135,884 A * | 10/2000 | Hedrick et al. .................. 463/20 |
| 6,142,876 A | 11/2000 | Cumbers |
| 6,149,522 A | 11/2000 | Alcorn et al. |
| 6,178,510 B1 | 1/2001 | O'Connor et al. |
| 6,210,279 B1 | 4/2001 | Dickinson |
| 6,244,957 B1 | 6/2001 | Walker et al. |
| 6,253,119 B1 | 6/2001 | Dabrowski |
| 6,270,410 B1 | 8/2001 | DeMar et al. |
| 6,280,326 B1 | 8/2001 | Saunders |
| 6,285,868 B1 | 9/2001 | LaDue |
| 6,287,200 B1 | 9/2001 | Sharma |
| 6,312,333 B1 | 11/2001 | Acres |
| 6,331,144 B1 | 12/2001 | Walker et al. |
| 6,336,857 B1 * | 1/2002 | McBride ......................... 463/12 |
| 6,340,331 B1 | 1/2002 | Saunders et al. |
| 6,343,988 B1 | 2/2002 | Walker et al. |
| 6,347,996 B1 | 2/2002 | Gilmore et al. |
| 6,361,437 B1 | 3/2002 | Walker et al. |
| 6,371,852 B1 | 4/2002 | Acres |
| 6,379,248 B1 | 4/2002 | Jorasch et al. |
| 6,383,077 B1 | 5/2002 | Kweitko et al. |
| 6,488,585 B1 | 12/2002 | Wells et al. |
| 6,508,709 B1 | 1/2003 | Karmarkar |
| 6,508,710 B1 | 1/2003 | Paravia et al. |
| 6,511,377 B1 | 1/2003 | Weiss |
| 6,514,140 B1 | 2/2003 | Storch |
| 6,533,662 B2 | 3/2003 | Soltys et al. |
| 6,554,707 B1 | 4/2003 | Sinclair et al. |
| 6,612,928 B1 | 9/2003 | Bradford et al. |
| 6,645,068 B1 | 11/2003 | Kelly et al. |
| 6,676,522 B2 | 1/2004 | Rowe et al. |
| 6,679,775 B1 | 1/2004 | Luciano et al. |
| 6,681,984 B2 | 1/2004 | Brunner |
| 6,682,421 B1 | 1/2004 | Rowe et al. |
| 6,687,700 B1 | 2/2004 | Cornelius et al. |
| 6,702,672 B1 | 3/2004 | Angell et al. |
| 6,712,698 B2 | 3/2004 | Paulsen et al. |
| 6,716,103 B1 | 4/2004 | Eck et al. |
| 6,722,985 B2 | 4/2004 | Criss-Puszkiewicz et al. |
| 6,729,957 B2 | 5/2004 | Burns et al. |
| 6,732,195 B1 | 5/2004 | Baldwin |
| 6,758,393 B1 | 7/2004 | Luciano et al. |
| 6,761,637 B2 | 7/2004 | Weston et al. |
| 6,800,029 B2 | 10/2004 | Rowe et al. |
| 6,805,634 B1 | 10/2004 | Wells et al. |
| 6,846,238 B2 | 1/2005 | Wells |
| 6,852,031 B1 | 2/2005 | Rowe |
| 6,935,958 B2 | 8/2005 | Nelson |
| 6,971,956 B2 | 12/2005 | Rowe et al. |
| 6,984,175 B2 | 1/2006 | Nguyen et al. |
| 7,260,834 B1 | 8/2007 | Carlson |
| 7,350,696 B2 | 4/2008 | Frerking |
| 7,867,081 B2 | 1/2011 | Schneider et al. |
| 2001/0044337 A1 | 11/2001 | Rowe et al. |
| 2002/0142846 A1 | 10/2002 | Paulsen |
| 2002/0152120 A1 | 10/2002 | Howington |
| 2003/0003997 A1 * | 1/2003 | Vuong et al. .................... 463/42 |
| 2003/0045353 A1 | 3/2003 | Paulsen et al. |
| 2003/0045354 A1 | 3/2003 | Giobbi |
| 2003/0083126 A1 | 5/2003 | Paulsen et al. |
| 2003/0087652 A1 | 5/2003 | Simon et al. |
| 2003/0148812 A1 | 8/2003 | Paulsen et al. |
| 2003/0186739 A1 * | 10/2003 | Paulsen et al. .................. 463/25 |
| 2003/0199312 A1 * | 10/2003 | Walker et al. .................. 463/25 |
| 2003/0224854 A1 * | 12/2003 | Joao ................. 463/40 |
| 2003/0228907 A1 | 12/2003 | Gatto et al. |
| 2004/0002386 A1 | 1/2004 | Wolfe et al. |
| 2004/0014518 A1 * | 1/2004 | Iwamoto ........................ 463/20 |
| 2004/0048667 A1 | 3/2004 | Rowe |
| 2004/0092307 A1 * | 5/2004 | George et al. ................... 463/29 |
| 2004/0204244 A1 | 10/2004 | Rathsack et al. |
| 2004/0209690 A1 | 10/2004 | Bruzzese et al. |
| 2005/0009600 A1 | 1/2005 | Rowe et al. |
| 2005/0054438 A1 | 3/2005 | Rothschild et al. |
| 2005/0090304 A1 * | 4/2005 | Crawford et al. ............... 463/13 |
| 2006/0068904 A1 | 3/2006 | Nguyen et al. |
| 2007/0004510 A1 | 1/2007 | Underdahl et al. |
| 2007/0060311 A1 | 3/2007 | Rowe et al. |
| 2007/0060394 A1 | 3/2007 | Gowin et al. |
| 2007/0087834 A1 | 4/2007 | Moser et al. |
| 2007/0117623 A1 | 5/2007 | Nelson et al. |
| 2008/0188308 A1 | 8/2008 | Rowe et al. |

FOREIGN PATENT DOCUMENTS

| | | |
|---|---|---|
| DE | 42 05 098 | 8/1993 |
| DE | 195 02 613 | 1/1995 |
| EP | 0 015 081 | 9/1980 |
| EP | 1 004 970 | 5/2000 |
| EP | 1481342 | 12/2004 |
| RU | 2 060 756 | 5/1996 |
| RU | 2 072 560 | 1/1997 |
| RU | 2 145 116 | 1/2000 |
| RU | 2004128939 | 2/2006 |
| WO | WO 95/24689 | 9/1995 |
| WO | WO 96/12262 | 4/1996 |
| WO | WO 96/00950 | 11/1996 |
| WO | 98/30297 A1 | 7/1998 |
| WO | WO 99/22350 | 5/1999 |
| WO | WO 01/25992 | 4/2001 |
| WO | WO 01/54091 | 7/2001 |
| WO | WO 01/76710 | 10/2001 |
| WO | WO 01/91075 | 11/2001 |
| WO | WO 01/91866 | 12/2001 |
| WO | WO 02/21370 | 3/2002 |
| WO | WO 02/058020 | 7/2002 |
| WO | WO 03/075203 | 9/2003 |
| WO | WO 03/084625 | 10/2003 |
| WO | WO 2004/024268 | 3/2004 |
| WO | 2004/090818 A2 | 10/2004 |
| WO | 2006/010011 A2 | 1/2006 |

OTHER PUBLICATIONS

International Search Report and Written Opinion dated Mar. 13, 2006 from related PCT Application No. PCT/US2005/024298 (15 pages).
Foreign Search Report and Written Opinion dated Jul. 25, 2005 from related PCT Application No. PCT/US2005/011217 (11 pages).
"Using the Internet to File Your Taxes" and "Source Page for Year 2000 Links for Tax-Do-It-Yourselfers," C.A. Holt (published Jan. 19, 2001 and last updated 26/01).
"The Tax Man Cometh," CasinoGaming.com, Parts I and II (undated).
"Taxable and Nontaxable Income, Including Gaming Gain/Loss," Publication 525, IRS.com (undated).
"40% of People Change their Byring Decision by the Time a Contact is Mailed to Them for Signing." Silanis (Aug. 8, 2001).
"AlphaTrust Pronto", AlphaTrust (Aug. 6, 2001).
E-Lock Technologies.
International Search Report (counterpart PCT application).
Examination Report from counterpart EP patent Application (6 pgs.).
Australian Office Action dated Jul. 3, 2008 from AU Application No. 2003225966.

Bronstein et al., "Three-Dimensional Face Recognition," International Journal of Computer Vision, vol. 64/1, Aug. 2005 (44 pgs.).
Canadian Office Action dated Mar. 20, 2009 from Application No. 2,405,166, 2 pgs.
Examination Report dated Nov. 13, 2007, from corresponding British Patent Application No. GB0620783.1, 2 pages.
LeMay et al., "Gaming Machine Virtual Player Tracking and Related Services", Filed Aug. 18, 2000, U.S. Appl. No. 09/642,192.
Notice of Allowance and Fee(s) Due dated Apr. 9, 2004 from U.S. Appl. No. 10/115,164.
Notice of Allowance and Fee(s) Due dated Sep. 10, 2003 from U.S. Appl. No. 09/544,884.
Notice of Allowance and Fee(s) Due dated Sep. 30, 2005 from U.S. Appl. No. 10/044,218.
U.S. Advisory Action dated Mar. 3, 2004 from U.S. Appl. No. 10/115,164.
U.S. Examiner Interview Summary dated Apr. 8, 2005 from U.S. Appl. No. 10/044,218.
U.S. Examiner Interview Summary dated Aug. 8, 2003 from U.S. Appl. No. 09/544,884.
U.S. Examiner Interview Summary dated Feb. 4, 2003 from U.S. Appl. No. 09/544,884.
U.S. Office Action dated Jan. 28, 2010 from U.S. Appl. No. 10/817,156.
U.S. Office Action dated Jul. 31, 2009 from related U.S. Appl. No. 10/886,944.
U.S. Office Action dated Jun. 1, 2009 from U.S. Appl. No. 10/817,156.
U.S. Office Action dated Jun. 24, 2008 from related U.S. Appl. No. 10/886,944 10 pages.
U.S. Office Action dated Jun. 5, 2002 from U.S. Appl. No. 09/544,884.
U.S. Office Action dated Mar. 10, 2009 from U.S. Appl. No. 10/886,944, 10 pgs.
U.S. Office Action dated May 7, 2003 from U.S. Appl. No. 09/544,884.
U.S. Office Action dated Nov. 12, 2002 from U.S. Appl. No. 09/544,884.
U.S. Office Action dated Nov. 29, 2001 from U.S. Appl. No. 09/544,884.
U.S. Office Action dated Nov. 9, 2009 from U.S. Appl. No. 10/817,156.
U.S. Office Action dated Sep. 23, 2008 from U.S. Appl. No. 10/817,156.
Yuan et al., Virtual Private Networks—Technologies and Solutions,: Addison-Wesley, ISBN#0-201-70209-6, 2001 (8 pgs.).
U.S. Office Action dated Feb. 27, 2003 issued in U.S. Appl. No. 10/003,921.
U.S. Office Action dated Jun. 25, 2009 issued in U.S. Appl. No. 11/266,636.
U.S. Final Office Action dated Jan. 6, 2010 issued in U.S. Appl. No. 11/266,636.
U.S. Advisory Action dated Mar. 19, 2010 issued in U.S. Appl. No. 11/266,636.
U.S. Office Action dated Feb. 17, 2011 issued in U.S. Appl. No. 11/266,636.
U.S. Final Office Action dated Jun. 2, 2011 issued in U.S. Appl. No. 11/266,636.
U.S. Advisory Action dated Aug. 15, 2011 issued in U.S. Appl. No. 11/266,636.
Australian Examiner's First Report dated Oct. 19, 2006 issued in AU Application No. 2002367741.
PCT International Search Report dated Feb. 5, 2003 issued in PCT/US02/08070.
PCT International Preliminary Examination Report dated Dec. 3, 2003 issued in PCT/US02/08070.
EP Examination Report dated Apr. 5, 2007 issued in EP No. 02807016.7.
UK Examination Report dated Apr. 28, 2006 from related GB Application No. 0422040.6 (3 pgs.).
Bruzzese et al., U.S. Office Action dated Jun. 12, 2007 from related U.S. Appl. No. 10/817,156.
Bruzzese et al., U.S. Office Action dated Dec. 20, 2006 from related U.S. Appl. No. 10/817,156.
European Search Report dated Jun. 30, 2005 from related EP Application No. 04252032.0 (3 pgs.).
Examination Report dated Mar. 28, 2007, from related British Patent Application No. 0620783.1.
Nguyen et al., U.S. Office Action dated Jun. 7, 2004 from related U.S. Appl. No. 10/085,779.
Nguyen et al., Notice of Allowance and Fee(s) Due dated Apr. 5, 2005 from related U.S. Appl. No. 10/085,779.
Nguyen et al., Notice of Allowance and Fee(s) Due dated Sep. 27, 2005 from related U.S. Appl. No. 10/085,779.
Rowe et al., U.S. Office Action dated Jun. 1, 2004 from related U.S. Appl. No. 10/044,218.
Rowe et al., U.S. Office Action dated Jan. 25, 2005 from related U.S. Appl. No. 10/044,218.
Rowe et al., Notice of Allowance and Fee(s) Due dated Jun. 15, 2005 from related U.S. Appl. No. 10/044,218.
Rowe et al., U.S. Office Action dated Dec. 16, 2003 from related U.S. Appl. No. 10/115,164.
Rowe et al., U.S. Office Action dated Jul. 2, 2003 from related U.S. Appl. No. 10/115,164.
Kiplinger Tax Cut for Federal Tax Year 1999 released Jan. 2000, photocopy of box including front, back, side and open flaps (5 pages).
"Using the Internet to File Your Taxes" and "Source Page For Year 2000 Links for Tax-Do-It-Yourselfers," C.A. Holt (published Jan. 19, 2001 and last updated Jan. 26).
Behrman et al., "The Case of the Invisible Ink: E-Signatures", Customer Interaction vol. 4, Brief 6, pp. 1-11 (Dec. 21, 2000).
"Electronic Signature Capture for E-Commerce & Emerging Internet Applications", ePad (Apr. 6, 1999).
"Electronic Signature Capture is Taking the Computer World by Storm for the Basic Reason fo Reducing Costly Paper. Integrate OrionSign into your Application Today and You'll be Capturing Signatures Tomorrow!" OrionSign (Aug. 6, 2001).
"Sign and Your Signature is Valid. Anywhere." CIC Products (Aug. 6, 2001).
"40% of People Change their Byring Decision by the Time a Contact is Mailed to Them for Signing." Silanis (Aug. 8, 2001).
"E-Signatures: Handwriting on the wall." Red Herring pp. 43 (Sep. 2000).

* cited by examiner

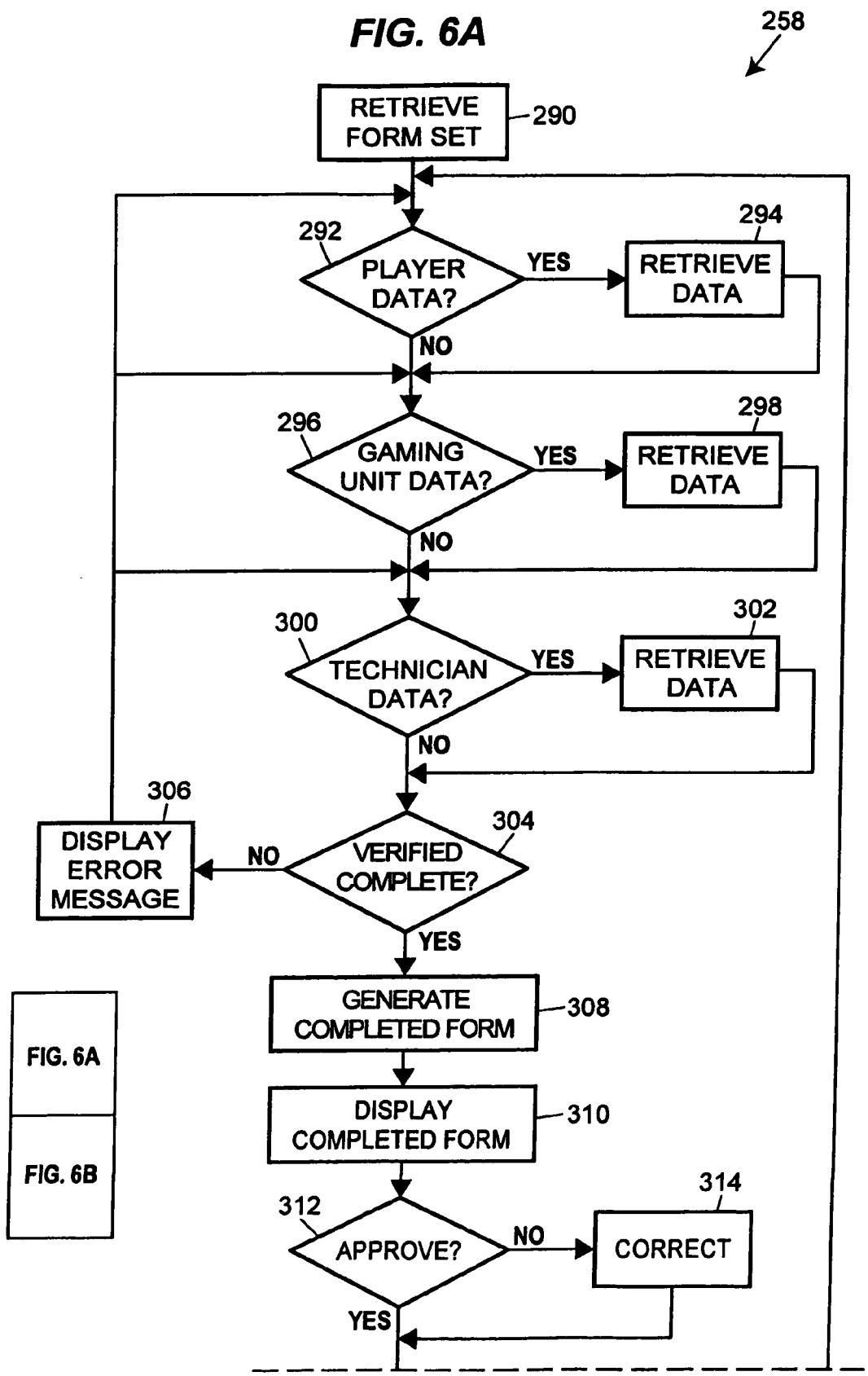

METHOD FOR DISTRIBUTING LARGE PAYOUTS WITH MINIMAL INTERRUPTION OF A GAMING SESSION

CROSS REFERENCE TO RELATED APPLICATION

This application is a continuation in part of U.S. Patent application Ser. No. 11/266,636, entitled "ELECTRONIC PAYOUT ADMINSTRATION METHOD AND SYSTEM" filed Nov. 3, 2005, which claims priority to and is a continuation of U.S. Patent application Ser. No. 10/085,779 (now U.S. Pat. No. 6,984,175) entitled "ELECTRONIC PAYOUT ADMINSTRATION METHOD AND SYSTEM" filed Feb. 28, 2002, both of which are incorporated herein by reference.

This application is also related to the following applications, all of which are herein incorporated by reference: U.S. patent application Ser. No. 09/544,884, titled "WIRELESS GAMING ENVIRONMENT", filed Apr. 7, 2000, and U.S. patent application Ser. No. 10/003,921, titled "GAMING MACHINE WITH ELECTRONIC TAX FORM FILING FUNCTION", filed Oct. 31, 2001.

FIELD OF THE INVENTION

The present invention relates to apparatus and methods for administering payouts in gaming machines, gaming tables and the like. More particularly, the present invention relates to improved techniques for distributing large payouts without interrupting a gaming session.

BACKGROUND OF THE INVENTION

In order to initiate a gaming session, a player typically inserts a token or money into a gaming machine to establish credits on the gaming machine. The player then chooses the size of the bet and begins the game by pressing a button or pulling a lever. If the game is a winner, a jackpot is paid to the player in accordance with the outcome of the game, pay tables and the amount of the bet. In some cases, small jackpots are won. The small jackpots are typically paid by increasing the player's credits or cashing out. With regards to cashing out, coins may drop in a hopper or alternatively the player may receive a printed ticket that can be exchanged for cash or inserted into a bill acceptor of another machine to add previously accumulated credits to the credit meter of the new machine.

In other cases, large jackpots are won. Large jackpots typically don't follow the same rules because of gaming and tax regulations. Normally, a win of $1200 or more requires that the gaming machine lock up and wait so that a gaming operator can gather data from the winning player and the gaming machine. The data is used to complete a variety of forms in accordance with gaming and tax regulations (e.g., W2-G form, etc.). As should be appreciated, because the gaming industry handles and transfers sizable amounts of value, for example, in the form of coin, paper currency, and electronic media, federal, state and local taxing agencies are interested in accurate reporting of the value transfers involved.

Unfortunately, this process takes some time thereby interrupting a player's gaming session, which leaves a negative impression on the player. Typically, the gaming operator is not available at the time of the jackpot as they may be performing other tasks. Further, they must gather the appropriate forms. Thus, it may take some time before they even get to the machine. Once the gaming operator is at the machine, data from the gaming machine is obtained and the required forms are filled out completely by the gaming operator as well as the player. For example, the player may be required to provide information including name, social security number, address, as well as a signature. Once this process is complete, the operator restarts the gaming machine so that the gaming session can continue. At a bare minimum, this can take about 15 minutes, but typically takes much longer.

This problem is exacerbated when you consider high roller machines that readily accept bets of up to $1000. Any payout that doubles this bet will create the aforementioned interruptions. Since these payouts are very common, interruptions are typically incurred over and over again during a gaming session thereby worsening the problem.

Based on the foregoing, improved techniques for distributing large payouts without interrupting a gaming session are desired.

SUMMARY OF THE INVENTION

The invention relates, in one embodiment, to a method of administering payouts for a gaming apparatus. The method includes playing a game associated with gaming apparatus in accordance with player inputs. The method also includes monitoring game play for rewards that exceed a predetermined amount. Rewards exceeding the predetermined amount requiring the payout thereof to be documented. If the reward does not exceed the predetermined amount, the method includes automatically implementing a first payout procedure at the gaming apparatus. If the reward exceeds the predetermined amount, the method includes automatically implementing a second payout procedure at the apparatus. The second payout procedure includes documenting the payout without stopping the gaming session so that game play may be continued without substantially interrupting game play.

The invention relates, in another embodiment, to a method for distributing a large payout without interrupting a gaming session. The method includes monitoring for payouts that exceed a predetermined threshold. If a payout exceeds the predetermined threshold, the method includes automatically transferring the value of the payout from the gaming apparatus to a removable storage medium. The method also includes automatically resetting the gaming apparatus to the current credits in order to allow the gaming session to continue without interruption.

The invention relates, in another embodiment, to a method for distributing a large payout without interrupting a gaming session. The method includes monitoring for payouts that exceed a predetermined threshold. The method also includes obtaining player data if a payout exceeds the predetermined threshold. The method further includes automatically obtaining gaming data at the time of the jackpot. The method additionally includes automatically creating and storing record linking the gaming data and player data. Moreover, the method includes automatically resetting a credit meter of the gaming machine when the record has been made.

The invention relates, in another embodiment, to a method for automatically filing forms associated with a large jackpot. The method includes receiving gaming data and player data associated with a large jackpot. The method also includes filling out the required forms using the gaming and player data. The method further includes obtaining a digital signature from the player involved in the large jackpot. The method additionally includes applying the digital signature to the filled out forms. Moreover, the method includes electronically filing the completed forms.

The invention relates, in another embodiment, to a method for distributing a large payout without interrupting a gaming session. The method includes monitoring a game for a triggering payout event. The method also includes obtaining player tracking information for the player associated with the triggering payout event. The method further includes obtaining appropriate electronic forms associated with triggering payout event. The method additionally includes marrying the electronic forms to the player tracking information. Moreover, the method includes electronically filing the electronic forms at various agencies as appropriate for the location of the player.

BRIEF DESCRIPTION OF THE DRAWINGS

The invention may best be understood by reference to the following description taken in conjunction with the accompanying drawings in which:

FIGS. 6A-B are flowcharts of a electronic payout administration routine that may be performed during operation of the gaming system of FIG. 1, in accordance with one embodiment of the present invention.

DETAILED DESCRIPTION OF THE INVENTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. §112, sixth paragraph.

Figure 1:
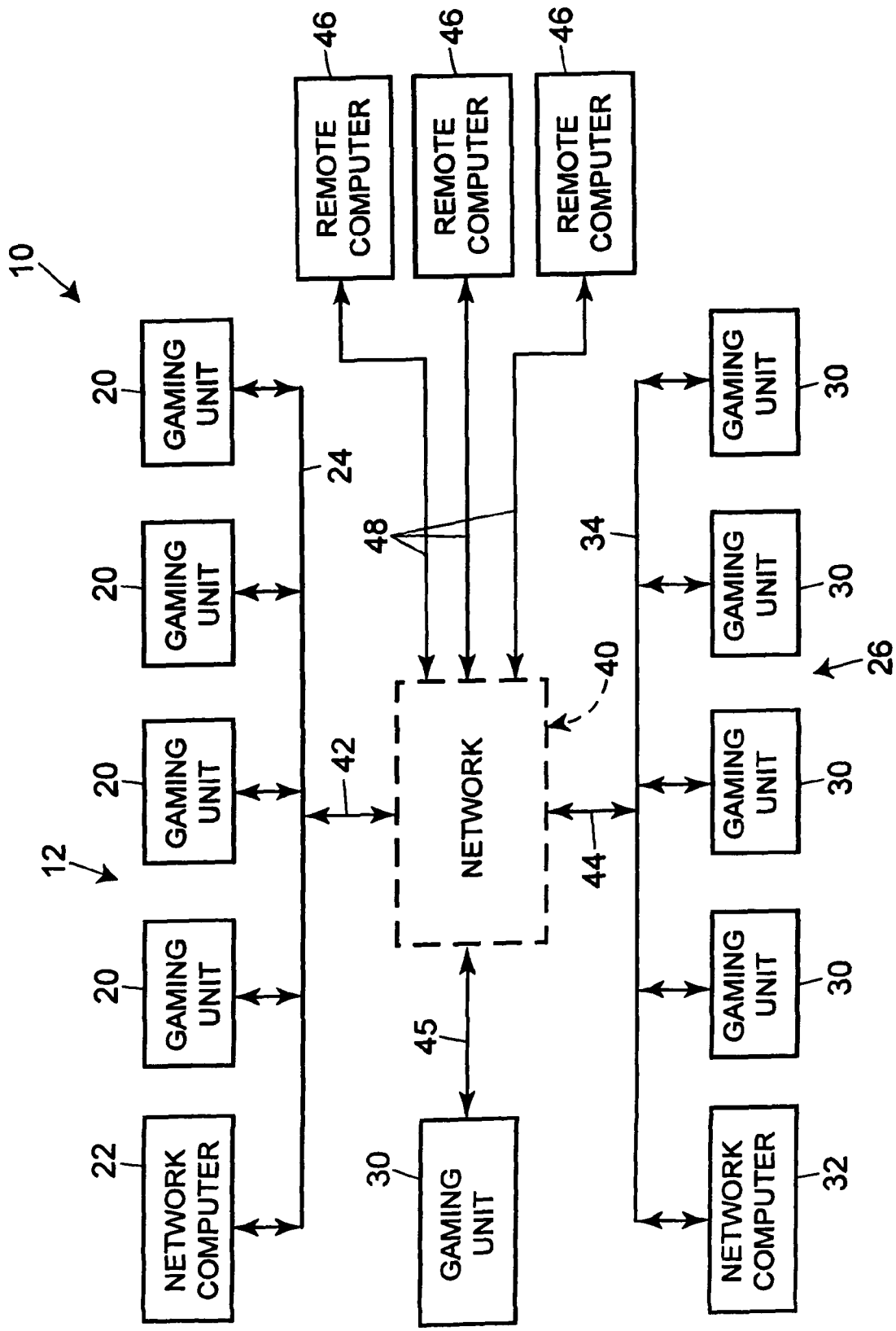
FIG. 1 is a block diagram of an embodiment of a gaming system, in accordance with one embodiment of the present invention.

FIG. 1 illustrates an embodiment of a gaming system 10. Referring to FIG. 1, the gaming system 10 may include a first group or network 12 of one or more gaming units 20 that may be operatively coupled to a network computer 22 via a network data link or bus 24. The gaming system 10 may include a second group or network 26 of one or more gaming units 30 that may be operatively coupled to a network computer 32 via a network data link or bus 34. The first and second gaming networks 12, 26, may be operatively coupled to each other via a network 40 and network links 42, 44, and one or more of the gaming units 20, 30 (gaming units 30 as shown) may be operatively coupled to the respective group 12, 26 via the network 40 and network links 45. The network 40 may also be connected to one or more remote computers 46 of one or more federal, state, and/or local agencies, the gaming unit manufacturer, and/or the system operator by network links 48. The network 40 may comprise, for example, the Internet, an intranet, a wide area network (WAN), or a local area network (LAN).

The first network 12 of gaming units 20 may be provided in a first geographic location, and the second network 26 of gaming units 30 may be provided in other geographic locations than the first geographic location. For example, the gaming units 20, 30 may be located in different areas of the same building, city, state or country. Similarly, the remote computers 46 may be disposed in a different geographic location than the networks 12, 26, and in particular the network computers 22, 32, such as in a different city, state or country or simply in a different location in the same building. The network 40 may include a plurality of network computers or server computers (not shown), each of which may be operatively interconnected. Where the network 40 comprises the Internet, data communication may take place over the communication links 42, 44, 45 and 48 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four to six gaming units 20, 30, it should be understood that different numbers of computers and gaming units may be utilized. For example, the networks 12, 26 may include tens or hundreds of network computers 22, 32 and tens or hundreds of gaming units 20, 30, all of which may be interconnected via the data links 24, 34. The data links 24, 34 (as well as network links 42,44, 45, 48) may be dedicated hardwired links, optical links or wireless links. Although the data links 24, 34 (42, 44, 45, 48) are shown as single data links, the data links 24, 34 (42, 44, 45, 48) may comprise multiple data links. As another alternative, a peer-to-peer network may be used, in which case there would be no need for the network computers 22, 32 because the gaming units 20, 30 would instead share the processing handled by the network computers 22, 32 in the gaming system 10 as illustrated.

Gaming Unit

Each gaming unit 20, 30 may be any type of gaming unit and may have various different structures and methods of operation. For example, in addition to the embodiments discussed below, the gaming unit 20, 30 may include a computer (personal computer or laptop), a Personal Digital Assistant (PDA), a gaming table, and/or a cellular phone. Thus, while various designs of the gaming units 20 are described below, it should be recognized that numerous other designs may be utilized.

Figure 2:
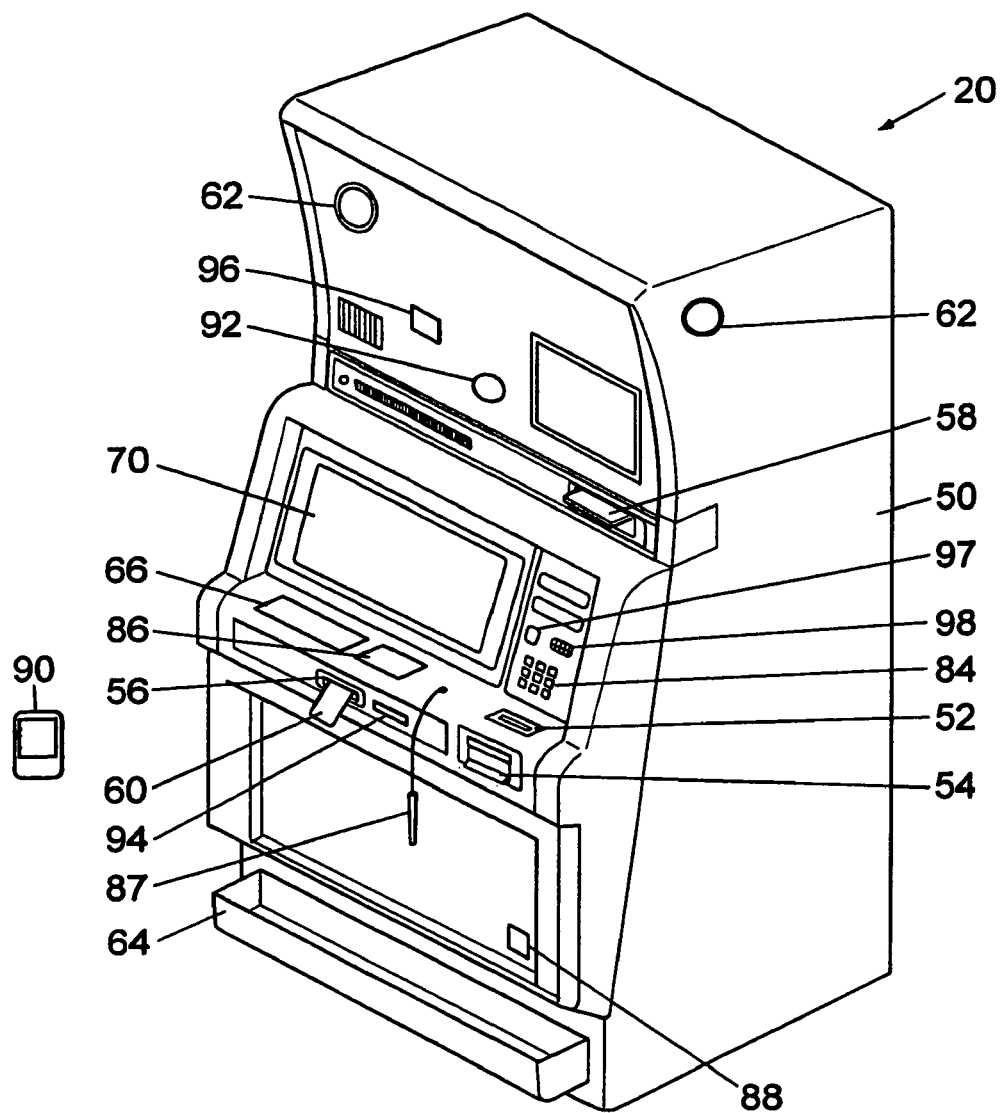
FIG. 2 is a perspective view of an embodiment of one of the gaming units shown schematically in FIG. 1, in accordance with one embodiment of the present invention.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30.

Referring to FIG. 2, the gaming unit 20 may include a housing or cabinet 50 and one or more input devices, which may include a coin slot or acceptor 52, a paper currency or bill acceptor 54, a ticket reader/printer 56 and a card reader 58, which may be used to input value to the gaming unit 20. A value input device may include any device that can accept value from a customer. As used herein, the term "value" may encompass money denominations or credits, and may be in the form of gaming tokens, coins, paper currency, ticket vouchers, electronic vouchers (stored, for example, on a card or PDA (Personal Digital Assistant)), credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a game. The input control panel 66 may be provided with a plurality of pushbuttons or touch-sensitive areas that may be pressed by a player to select games, make wagers, make gaming decisions, etc.

Figure 2A:
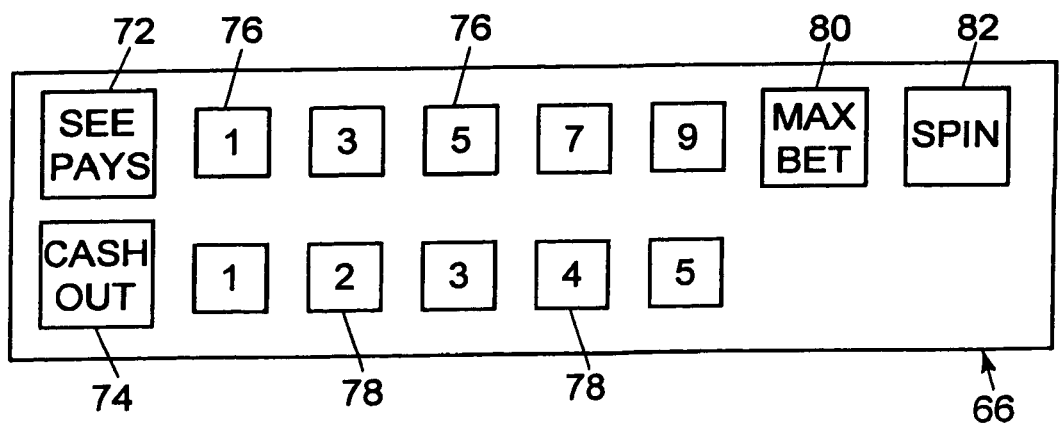
FIG. 2A illustrates an embodiment of a control panel for a gaming unit, in accordance with one embodiment of the present invention.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that the rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

As noted above, the gaming unit 20 may include a mechanism by which the gaming unit 20 may determine the identity of the player. In particular, the card reader 58 may be used to read a card that carries an identification code that may be uniquely associated with the player so that the gaming unit can differentiate that player from all other players, or so that the gaming unit can differentiate that player as a member of a group of players from all player not a member of the group of players. The gaming unit 20 may also include equipment, such as a keypad 84, an input pad 86 (with optional stylus 87), a port (or antenna) 88 adapted to communicate via a wired or wireless link (infrared or radio frequency link, for example) to a Personal Digital Assistant (PDA) 90, a camera 92, a scanner 94, a retinal (or iris) scanner 96, fingerprint scanner 97, and/or a microphone 98. The gaming unit 20 may include any one of the devices 58, 84, 86, 88, 90, 92, 94, 96, 97, 98, or the gaming unit 20 may include a combination of some or all of the devices 58, 84, 86, 87, 88, 90, 92, 94, 96, 97, 98.

In operation, a player may identify him or herself to the gaming unit 20 by entering a unique numeric or alpha-numeric code using the key pad 84, for example. Alternatively, the player may use his or her finger or the stylus 87 to sign his or her signature on the input pad 86. The pad 86 and/or stylus 87 may include instrumentation to record such characteristics as position, form, speed, and/or pressure as the player signs his or her signature. As a further alternative, the player may sign his or her signature on the Personal Digital Assistant 90, which signature is then converted to electronic data, and the data is then transferred via the port/antenna 88 to the gaming unit 20. As yet another alternative, the player may sign his or her signature on a piece of paper that is then photographed using the camera 92 or scanned using the scanner 94 (or the bill acceptor 54) to convert the signature into electronic data. As an additional alternative, the player may place one of his or her fingers or his or her hand on the scanner 97, and the scanner 97 may generate an electronic data representation of the fingerprint on one or more of the player's fingers or an electronic data representation of the pattern of the entire hand. Alternatively, the camera 92 may be used to take a picture (live or still) of the player, the picture then being converted into electronic data. As a still further alternative, the player may place his or her eye up to the retinal (or iris) scanner 96, and the retinal (or iris) scanner 96 may generate an electronic data representation corresponding to the pattern of the retina (or iris) of the player. As yet another alternative, the player may speak into the microphone 98, and characteristics of the spoken words (or voiceprint) may be converted into an electronic data representation.

Other equipment may also be used in conjunction with the identification equipment 84, 86, 88, 90, 92, 94, 96, 97, 98. For example, rather than using a stylus 87, a mouse or glove may be used. Additionally, thermal imaging equipment may be included or substituted. Moreover, a touchscreen may be integrated with the display unit 70 and used, in place of the input pad 86, in combination with a stylus or a finger, for example.

Gaming Unit Electronics

Figure 3:
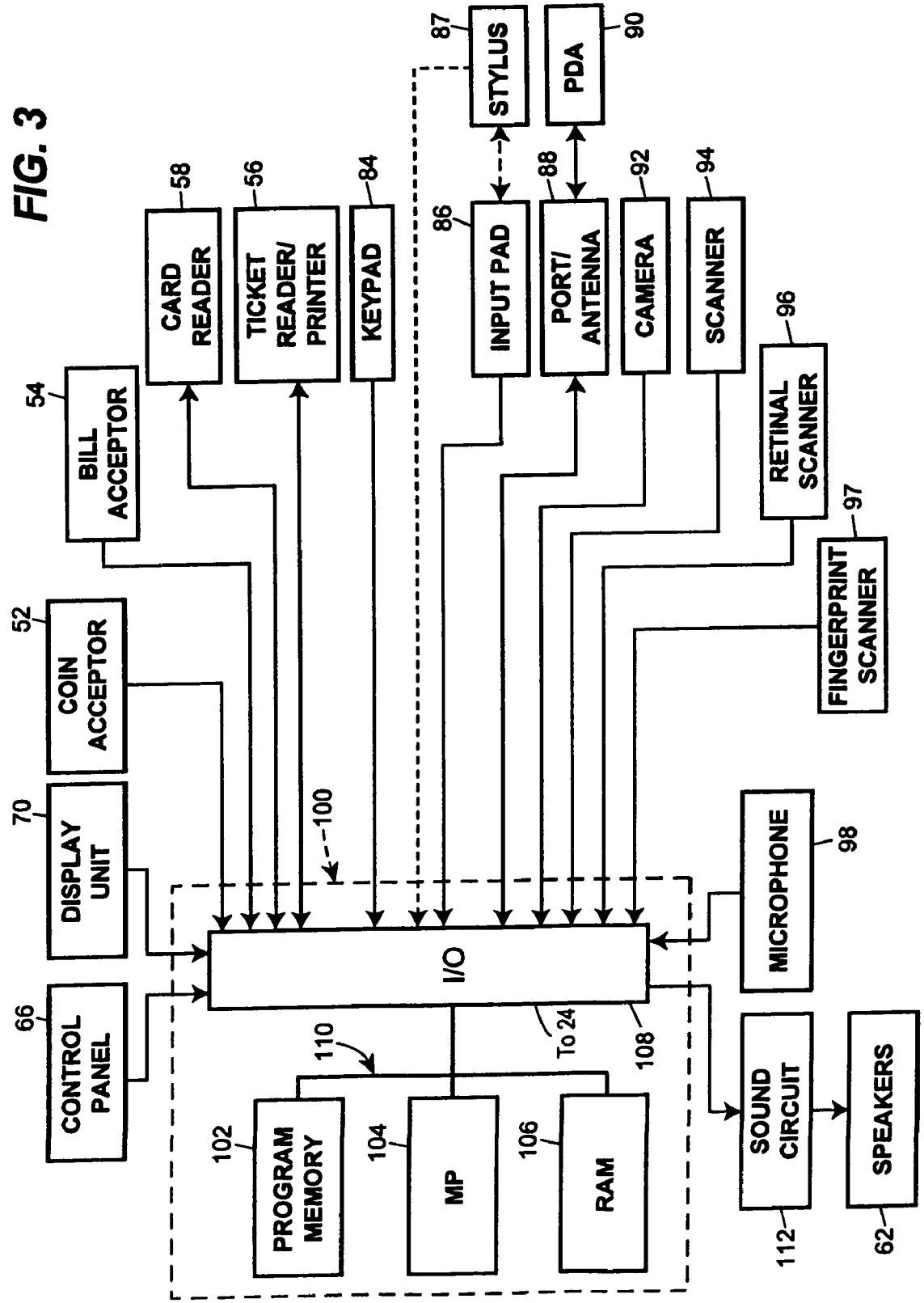
FIG. 3 is a block diagram of the electronic components of the gaming unit of FIG. 2, in accordance with one embodiment of the present invention.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the coin acceptor 52, the bill acceptor 54, the ticket reader/printer 56, the card reader 58, the control panel 66, the display unit 70, the keypad 84, the input pad 86 (and optionally the stylus 87), the port/antenna 88, the digital camera 92, the scanner 94, the retinal scanner 96, the fingerprint scanner 97 and the microphone 98 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 84, 86, (87), 88, 92, 94, 96, 97, 98, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Main Routine

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location (e.g., random number generation may occur remote to the gaming unit 20). Such remote control may be facilitated with the use of a wireless connection, or by an Internet interface that connects the gaming unit 20 with a remote computer (such as one of the network computers 22, 32) having a memory in which the computer program portions are stored. By storing the computer program portions therein, various portions of the memories 102, 106 are physically and/or structurally configured in accordance with computer program instructions.

The computer program portions may be written in any high-level language such as C, C++, C# or the like or any low-level, assembly or machine language. The computer program portions may be written in a browser-based language such as Java, ActiveX or the like. The computer program portions may also be written in a scripting language, like JavaScript, for example. In summary, all manner of languages may be used.

Figure 4:
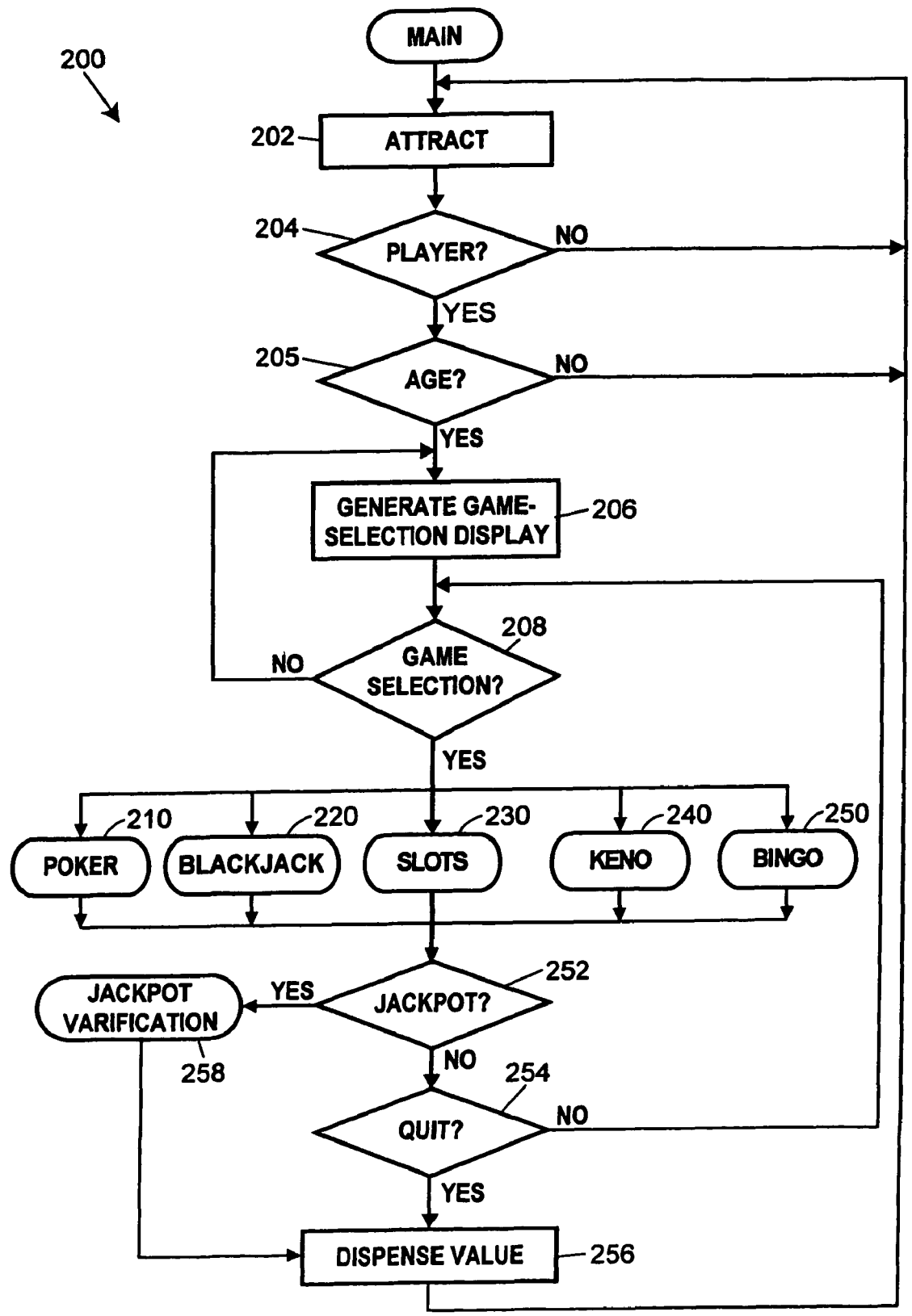
FIG. 4 is a flowchart of a main routine that may be performed during operation of one or more of the gaming units, in accordance with one embodiment of the present invention.

FIG. 4 is a flowchart of a main operating routine 200 that may be stored in the memory of the controller 100. The main routine 200 may begin operation at block 202 during which an attraction sequence may be performed in an attempt to induce a potential player to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and the routine may proceed to block 205. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if the player deposited paper currency into the gaming unit; the gaming unit 20 could determine if the player deposited a voucher or coupon into the gaming unit; etc.

At block 205, a determination may be made as to whether the player meets minimum age requirements (set by state gaming agencies, for example) necessary to operate the gaming unit 20. For example, in a registration event at the gaming system operator's place of business, the player may provide proof of age and identity. The data may then be stored in a memory, such as a server operating as a database at the gaming system operator's place of business or a more portable memory device, such as a memory card or a PDA. The age data may be accessed later to prove age qualification by matching (within established standards) the identity data stored with the age data. Alternatively, the player may provide a form of identification (such as a fingerprint or other form of biometric data, driver's license, or national identity card) that the gaming system operator may use to access age data established by a third party (for example, the state department of motor vehicles). As a further alternative, the camera 92 associated with the gaming unit may be used to monitor the player using the gaming unit 20. The determination of block 205 may be omitted where the gaming system operator can limit access by underage players to the gaming units 20 (for example, in a casino-type gaming environment as opposed to an Internet-type gaming environment). If the determination is made and the player fails to age qualify, then the routine may branch back to block 202; if the player age qualifies or the determination is omitted, then the routine proceeds to block 206.

At block 206, a game-selection display may be generated on the display unit 70 to allow the player to select a game available on the gaming unit 20. The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, the routine 200 may determine at block 252 if a jackpot was awarded. If no jackpot has been awarded, the routine 200 branches to block 254 to determine whether the player wishes to terminate play on the gaming unit 20 or to select another game. If the player wishes to stop playing the gaming unit 20, which wish may be expressed, for example, by selecting a "Cash Out" button 74, the controller 100 may dispense value to the player at block 256 based on the outcome of the game(s) played by the player. The operation may then return to block 202. If the player did not wish to quit as determined at block 254, the routine 200 may return to block 208 where the game-selection display may again be generated to allow the player to select another game.

If, on the other hand, it is determined that at block 252 that a jackpot has been awarded, the routine 200 branches to a payout administration routine 258. After the payout administration routine 258 has been performed, the routine 200 proceeds to block 256, and the jackpot award, along with whatever other value that the player has accumulated while playing the gaming unit 20, is distributed.

It should be noted that although five gaming routines are shown in FIG. 4, a different number of routines could be included to allow play of a different number of games. The gaming unit 20 may also be programmed to allow play of different games.

Figure 5:
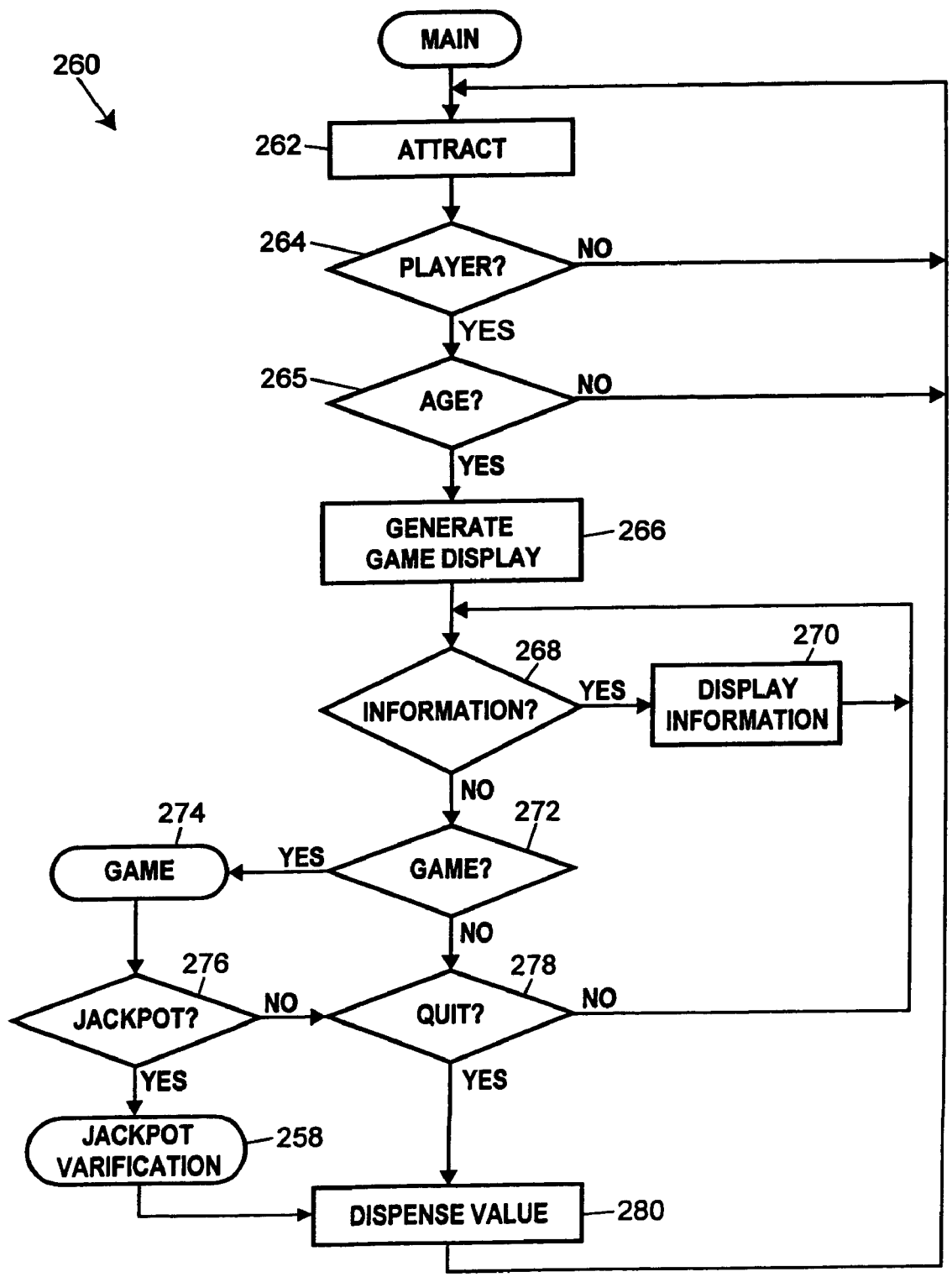
FIG. 5 is a flowchart of a main routine that may be performed during operation of one or more of the gaming units, in accordance with one embodiment of the present invention.

FIG. 5 is a flowchart of an alternative main operating routine 260 that may be stored in the memory of the controller 100. The main routine 260 may be utilized for gaming units 20 that are designed to allow play of only a single game or single type of game. Referring to FIG. 5, the main routine 260 may begin operation at block 262 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 264, the attraction sequence may be terminated and an age determination may be made at block 265. Assuming that the player is age-qualified or the age determination is omitted, then a game display may be generated on the display unit 70 at block 266. The game display generated at block 266 may include, for example, an image of the game that may be played on the gaming unit 20 and/or a visual message to prompt the player to deposit value into the gaming unit 20. At block 268, the gaming unit 20 may determine if the player requested information concerning the game, in which case the requested information may be displayed at block 270. Block 272 may be used to determine if the player requested initiation of a game, in which case a game routine 274 may be performed. The game routine 274 could be any one of the game routines disclosed herein, such as one of the five game routines 210, 220, 230, 240, 250, or another game routine.

After the routine 274 has been performed to allow the player to play the game, block 276 may be utilized to determine if a jackpot has been awarded. If a jackpot has been awarded, the routine 274 proceeds to block 258 wherein the payout administration routine is performed. If a jackpot has not be awarded, then the routine 274 proceeds to block 278 to determine whether the player wishes to terminate play on the gaming unit 20. If the player wishes to stop playing the gaming unit 20, which wish may be expressed, for example, by selecting the "Cash Out" button 74, the controller 100 may dispense value to the player at block 280 based on the outcome of the game(s) played by the player. The operation may then return to block 262. If the player did not wish to quit as determined at block 278, the operation may return to block 268.

Payout Administration Routine

Figure 6B:
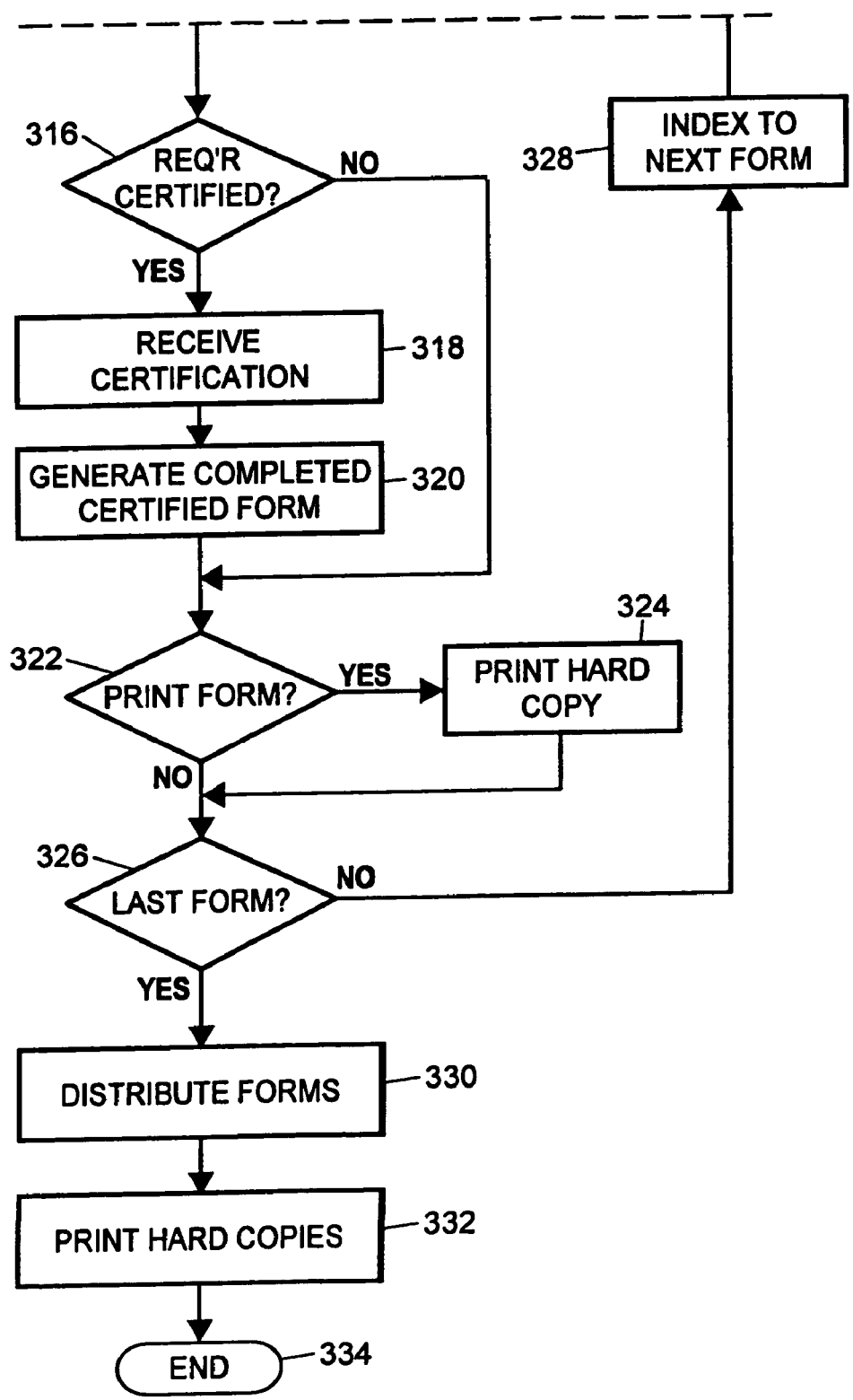

FIGS. 6A-B are a flowchart of one possible embodiment of the payout administration routine 258 shown schematically in FIGS. 4 and 5. The routine 258 may begin at block 290 with certain player and/or gaming unit verifications and the retrieval of a set of electronic forms necessary to meet the federal, state, and local regulatory agency requirements applicable to the payout awarded. Typically, a representative of the gaming system operator responsible for the system 10 will perform the retrieval of the forms, although the retrieval (and the entire routine for that matter) may be fully automated and displayed using the display unit 70, for example.

In regard to player verifications that may be performed at block 290, the age of the player may be initially checked. The comments made above regarding blocks 205, 265 may be equally applicable herein concerning the age qualification determination made at block 290. Moreover, the age of the player may be checked at block 290 even if the age was checked at block 205, 265 to provide additional confidence as to the player's age qualification.

Also, in regard to an implementation where gaming units 20, 30 may be operated at locations outside the gaming system operator's property (e.g., over the Internet), the gaming system operator may have to verify the location of the player and/or gaming unit 20, 30 before awarding the payout and performing the payout administration routine. This verification may ensure that the jackpot is legally awarded (as gaming is not legal in all jurisdictions), as well as ensuring that the correct forms are retrieved.

To verify the location of a gaming unit 20, 30 located outside the gaming system operator's property, the gaming unit 20, 30 may be associated with a device that provides location data for the gaming unit 20, 30 that may be transmitted to the gaming system operator. For example, the Global Positioning Satellite (GPS) system may be utilized by associating a special transceiver with the gaming unit. As a further example, the gaming system operator may require the player to connect to the system 10 using a cellular mobile station (or at a minimum to make a call using the mobile station or to turn the cellular mobile station on during play). The gaming system operator may then access the location information available to the cellular system operator after the cellular system operator has processed the cellular transmission data from the mobile station (such as may be done in providing enhanced 911 (or E-911) service, for example). Alternatively, the player may be required to connect to the system 10 from a land line (or to call the gaming system operator using a land line telephone during the verification process), whereupon the gaming system operator may check the telephone company's records to verify the number and pull the street address associated with the number. As a further alternative, where the player has connected to the system 10 over the Internet, the gaming system operator may check the IP address of the gaming unit 20, 30 and of the Internet service provider, and obtain a street address from the Internet service provider.

The forms may be retrieved from a database maintained at the gaming unit 20, the network computers 22, 32, or one of the remote computers 46, and the forms may be processed at the gaming unit 20, the network computer 22, 32 or the PDA 90 (in which case data may be transferred using the port/antenna 88), for example. The forms may include only those forms necessary to satisfy the requirements of the agencies of a particular jurisdiction (e.g., Nevada, New Jersey, California, etc.), or all of the forms necessary to satisfy the requirements of all jurisdictions may be stored. In the later case, as part of the retrieval of the forms, a determination may be made as to which agencies have jurisdiction of the system 10, network 26, 40, or the individual gaming unit 20. This determination may be made based on data programmed into the system 10, data entered each the time the retrieval of the forms is performed, or data obtained using the methods described above.

Once the forms have been retrieved, the first form may be processed by proceeding to block 292, where a determination may be made as to whether the form being processed requires data about the player (e.g., name, age, Social Security Number, address, phone number, shirt size, etc.). If it is determined that the form requires data about the player, data may be retrieved at block 294 from a source of stored personal data about the player.

The source of stored personal data may be a server that is part of the computer 22, 32 and that functions as a player personal data database and in which player personal data may be stored. Data may be entered into the database manually by the player and/or by an employee of the gaming system operator, or may be generated automatically, for example, by the servers that make up the computers 22, 32. The database may be periodically updated manually by the player and/or gaming system employees and/or automatically by the servers which make up the computer 22, 32 or which are associated with the computer 22, 32 and which monitor the player's usage of the gaming units 20 according to a voluntary player tracking system, for example.

If the data is to be entered manually, a device such as a keyboard or an input pad/stylus may be used. Alternatively, data may be entered by hand onto a sheet of paper that is scanned and converted into electronic data. For example, software such as OmniPage and TextBridge provided by Nuance Inc. (Peabody, Mass.), or similar programs from Expervision (Fremont, Calif.), ScanSoft Hungary Corp. (formerly Recognita, Budapest, Hungary), and Scantron (Tustin, Calif.), can convert handwriting to a computer text file.

The stored player data may be initially entered and uploaded to a database, such as a server that is part of the computer 22, 32, and then downloaded to a more portable memory device, such as a memory card or a PDA. The stored data may also be entered at the time the payout administration routine is performed and stored in temporary memory of the gaming unit 20, the computers 22, 32, 46 or the PDA 90, for example.

A determination may also be made at block 296 as to whether it is necessary to retrieve data about the gaming unit 100 to complete the form. If so, the routine may proceed to block 298; if not, the routine may proceed to block 300. At block 300, a determination may be made if it is necessary to retrieve data about the jackpot representative or technician gathering the data for the gaming system operator. If technician data is required, the routine may proceed to block 302; otherwise, the routine may proceed to block 304.

At block 304, the requirements of the form being processed and the data retrieved (at blocks 294, 298, 302) may be compared to determine if it is necessary to retrieve additional data. For example, if the data is initially retrieved from a database, there may be elements of data necessary to complete the form which are not typically stored in the database (e.g., shirt size or signature). In such a case, it may be necessary to enter additional data at the time the payout administration routine is performed (and store it in temporary memory) so that the forms may be completed. An error message may be displayed at block 306 to provide a indication as to why the routine cannot proceed, and the routine may return to block 292.

If all of the data necessary to complete the form has been retrieved, as determined at block 304, the routine may proceed to block 308 and the retrieved data may be combined with the form to generate a completed form. The completed form may be displayed, for example on the display unit 70 of the gaming unit 20 or the PDA 90, at block 310 for the player and/or jackpot representative/technician to review. As a result of the visual inspection of the completed form, a determination may be made if all of the retrieved data has been correctly combined with the form at block 312. If any of the entered data is incorrect, then at block 314 the incorrect data may be replaced with correct data. If no correction is required, or after any required correction is made, the routine may proceed to block 316.

At block 316, a determination may be made as to whether the complete form requires certification. Not all forms will require certification, but many may. If certification is required, the routine may proceed to block 318, and the completed form may be certified by the appropriate party, e.g. the player and/or the jackpot representative/technician.

The certification may be made by using any of a variety of mechanisms, including one or more of the following: the card reader 58, the keypad 84, the input pad 86 (and the stylus 87), the input port 88 (and the PDA 90), the digital camera 92, the scanner 94, the retinal (or iris) scanner 96, fingerprint scanner 97 and the microphone 100. As stated above, any of these devices may be used to sample and generate a representation, in the form of electronic data, of a unique characteristic of the party (Personal Identification Number (PIN), signature, fingerprint, voice print, appearance, etc.) wishing to certify the completed form. The electronic data representation of the unique characteristic may then be compared with stored data to determine if the electronic data representation accurately represents the party wishing to certify the complete form.

For example, using the stylus 87, a signature may be entered on the input pad 86. The signature may be captured using electronic signature capture software, and converted into electronic data (e.g., a bitmap image). The electronic data may then optionally be routed to electronic signature authentication software.

The signature capture software and the signature authentication software may be co-located at the gaming unit 100. Alternatively, the signature authentication software may be located remotely from the signature capture software. If the signature capture software and the signature authentication software are located remotely, then the electronic data may be encrypted before transmission and decrypted afterward.

The signature authentication software may determine if the electronic data falls within the authentication parameters of electronic data representing a signature in an electronic signature database. The comparison may be made using matching or pattern recognition techniques. The authentication parameters may be varied according to legal standards for authenticating "electronic signatures," according to industry custom and practice and/or according to gaming system operator preferences.

Once the certification is received, the certification may be combined with the completed form at block 320 to generate a certified completed form. Block 322 may be utilized to determine if a print out of the certified completed form is desired, and if it is, the form may be printed out using the printer 56 or a separate hand-held printer (not shown) coupled to the PDA 90 at block 324.

At block 326, a determination may be made as to whether the form just processed is the last form in the set that was selected. If the form is not the last form in the set, then the routine may index to the next form at block 328 and return to block 292. If the form is the last form in the set, the set of certified completed forms may be uploaded, encrypted and distributed to the one or more remote computers 46 at block 330. As a backup, one or more copies of the certified completed forms may be printed out either using the printer 56 or a remote printer (not shown) at block 332. The routine ends at block 334.

The following is provided as just one possible example of the operation of the payout administration routine 258.

Assuming that the determination is made at block 252, for example, that a jackpot (e.g., payout of greater than $1,200) has been awarded, then at block 290, a set of forms is retrieved. In this case, the set includes federal tax forms, as well as state and local gaming regulatory agency forms. The set also includes forms which the gaming system operator will use to process the jackpot award, and may include the jackpot check itself. This set is merely exemplary, and is not intended to be limiting.

The first form is the W-2G "Certain Gambling Winnings" form used to report the winnings to the U.S. Internal Revenue Service (I.R.S.). The W-2G requires personal data (including name and Social Security number) and a player certification, for example in the form of a signature. Consequently, at block 292, an affirmative answer leads to block 294 wherein the personal player data is retrieved, either from a database or from temporary storage after the jackpot representative enters the data based on the player's answers to questions displayed, for example, on the display unit 70.

Assuming that the necessary data is retrieved at block 294, a further affirmative answer to the determination that the form is complete results in the routine proceeding to blocks 308, 310 to combine the player personal data with the electronic W-2G form and display the completed form via the display unit 70. Assuming that the data has been correctly entered, such that there is no need to correct the form, the routine proceeds to blocks 316, 318 and the player provides his or her certification. For purposes of illustration, the player may enter his or her certification by using the stylus 87 to enter a signature on the input pad 86, although, as pointed out above, there are many different methods to enter the certification. The certified completed form is then generated at block 320.

Considering the nature of the W-2G form, the player may wish to have a copy of the certified completed form. Consequently, at blocks 322, 324, the printer 56 prints a copy of the certified completed W2G form, which is presented to the player. As this is not the last form in the set, at block 326 the routine returns to block 292 after indexing to the next form at block 328.

The next form to be completed is the U.S. I.R.S. W-9 "Request for Taxpayer Identification Number and Certification." The routine proceeds from blocks 292, 294 (where player personal data is retrieved, namely the player's name and Social Security number) to block 316 via blocks 308, 310, 312. At block 318, the player would certify by signing the input pad 86 using the stylus 87. Again, because of the nature of the form, a copy would be printed out for the player at blocks 322, 324 before returning to block 292 via blocks 326, 328.

The next form is the media release form. This form may requires data about the player (name, address) as well as the gaming unit 20 (casino, location in casino). The data is retrieved at blocks 292, 294, 296, 298 and used to generate the completed form at block 308. The player's signature (or "anonymous" mark) is received at block 318, before returning to block 292 via blocks 326, 328.

The routine the proceeds to the primary jackpot report and the primary jackpot hit report. These forms require data about the gaming unit 100 involved, so blocks 296, 298 are used to retrieve data about the gaming unit 100, for example, from the network computers 22, 32. At block 318, the forms are certified by the jackpot representative by entering his or her signature on the PDA 90 and transmitting the electronic data representation of the signature via the input port 88, for example.

The next form is the wide area program system questionnaire. This form requires data about the player, retrieved at blocks 292, 294, but does not require certification. Instead, the completed form will be displayed at block 310 for approval at block 312, and then the routine will return to block 292 via blocks 326, 328.

At this point, the initial payment jackpot check is prepared using player personal data (blocks 292, 294) and is printed out using the printer 56 (block 322, 324). The check may be scanned using scanner 94 for record keeping purposes. Additionally, a confirmation letter form is prepared from player personal data retrieved at blocks 292, 294, combined at block at block 308, and displayed at block 310. This letter is approved at block 312, and both the player and the jackpot representative certify at block 318. A copy of the letter is printed out at blocks 320, 322 for the player.

The next form relates to the selection of a lump-sum or annuity payment. The player has the option of receiving the jackpot as a single, or lump-sum, payment, or a series of payments as an annuity. If the player selects to received the jackpot in the form of the annuity payments, then an annuity notification letter form is prepared using player data at blocks 292, 294, and printed out at blocks 320, 322.

The gaming system operator may offer additional premiums to the winner of a jackpot, such as clothing or other merchandise. For example, the gaming system operator may provide a commemorative shirt to jackpot winners. In such a case, a shirt order form is prepared using player personal data at blocks 292, 294, and a copy is printed out and presented to the player at blocks 320, 322.

The last series of forms are prepared to satisfy state and local regulatory requirements regarding the operation of the gaming unit 100 that determined that a jackpot should be awarded. The series of forms include the primary jackpot administration form, the megajackpot seal recordation form, the gaming system operator communicator log sheet and the machine meter reading form. Each of these forms require the retrieval of data concerning the gaming unit (blocks 296, 298) and about the technician preparing the forms (blocks 300, 302). All of the forms are generated (block 308) and displayed (block 310) for approval (block 312) of the jackpot representative. When they are correct, the jackpot representative certifies each form at block 318.

With all of the forms prepared, the routine 258 passes to block 328, and the forms are distributed to the various agencies involved. The distribution may include having the appropriate forms uploaded, encrypted and transferred to a remote agency computer, or the forms may be routed to communications software that formats and transmits the forms to a remote agency facsimile machine (not shown). The distribution may also include uploading the forms to a dedicated jackpot database that the system operator maintains for purposes of verifying compliance with regulatory requirements. Additional hard copies of the forms may be printed out at block 330 for archival purposes, or for manual mailing instead of electronic distribution.

Having discussed the operation of the main routine 200 and the payout administration routine 258, the gaming routines 210, 220, 230, 240, 250 are now discussed in greater detail.

Video Poker

Figure 7:
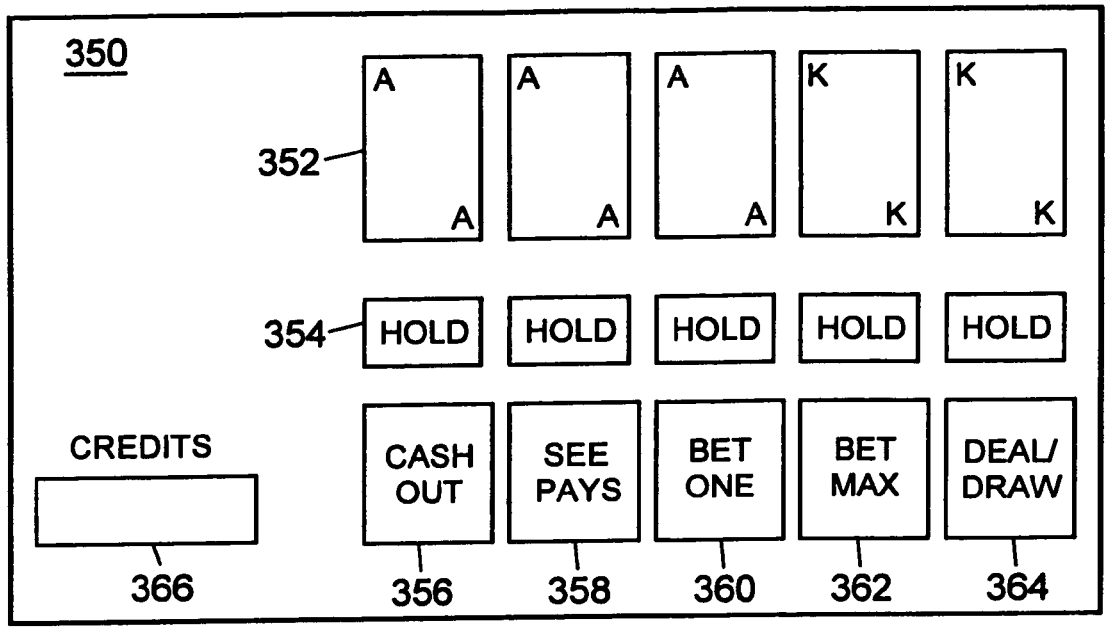
FIG. 7 is an illustration of an embodiment of a visual display that may be displayed during performance of the video poker routine of FIG. 9, in accordance with one embodiment of the present invention.

FIG. 7 is an exemplary display 350 that may be shown on the display unit 70 during performance of the video poker routine 210 shown schematically in FIG. 4. Referring to FIG. 7, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 9:
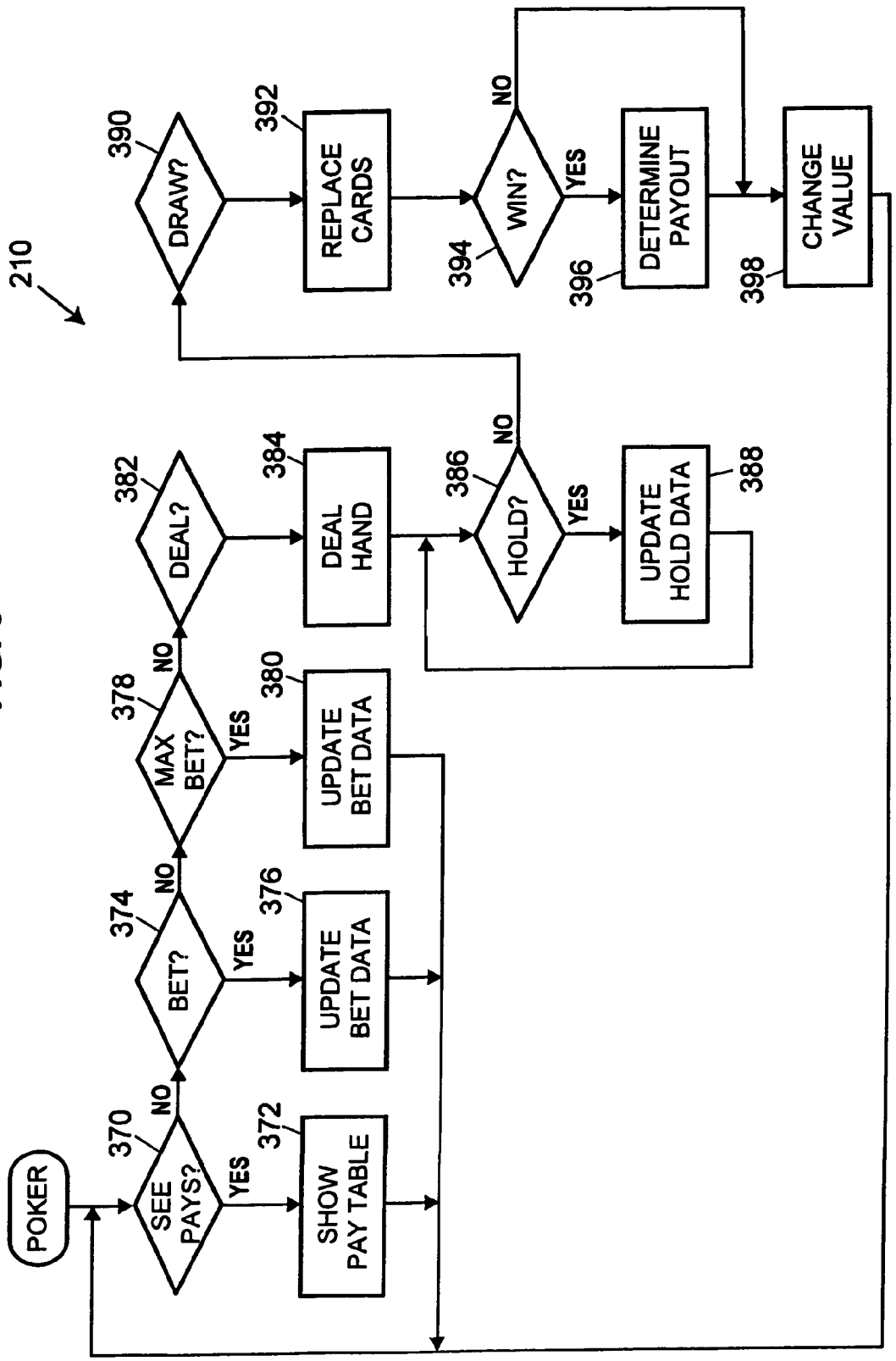
FIG. 9 is a flowchart of a video poker routine that may be performed by one or more of the gaming units, in accordance with one embodiment of the present invention.

FIG. 9 is a flowchart of the video poker routine 210 shown schematically in FIG. 4. Referring to FIG. 9, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 7).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 8:
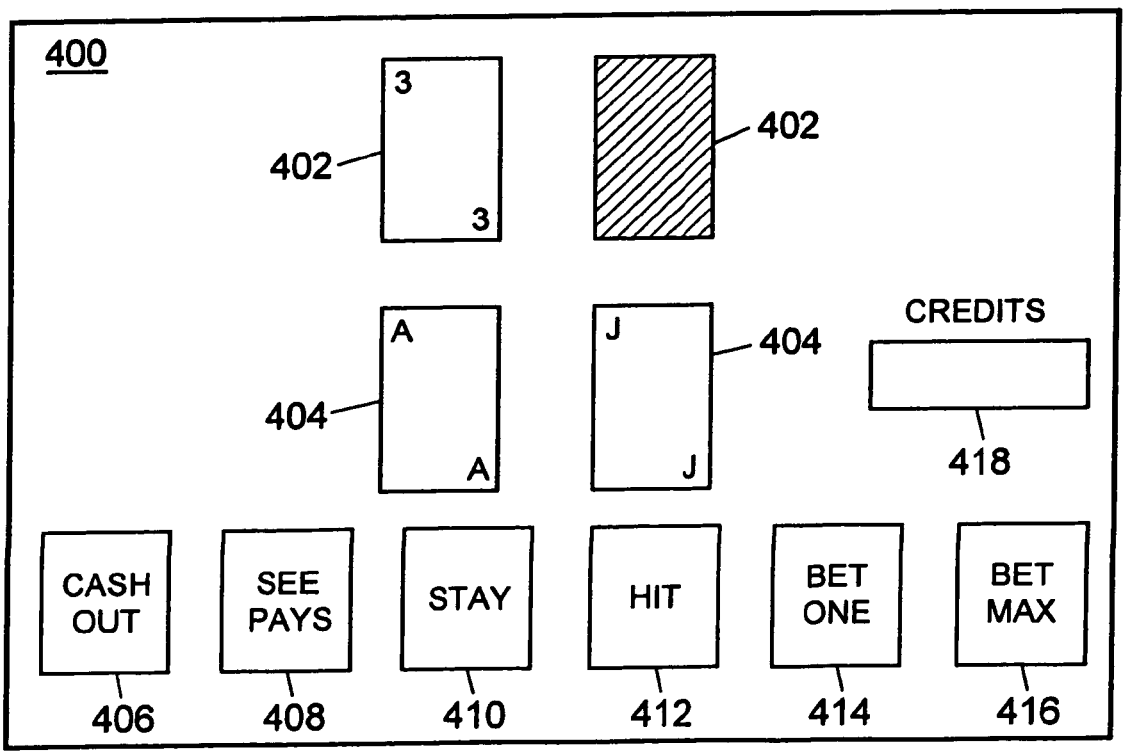
FIG. 8 is an illustration of an embodiment of a visual display that may be displayed during performance of the video blackjack routine of FIG. 10, in accordance with one embodiment of the present invention.

FIG. 8 is an exemplary display 400 that may be shown on the display unit 70 during performance of the video blackjack routine 220 shown schematically in FIG. 4. Referring to FIG. 8, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 10:
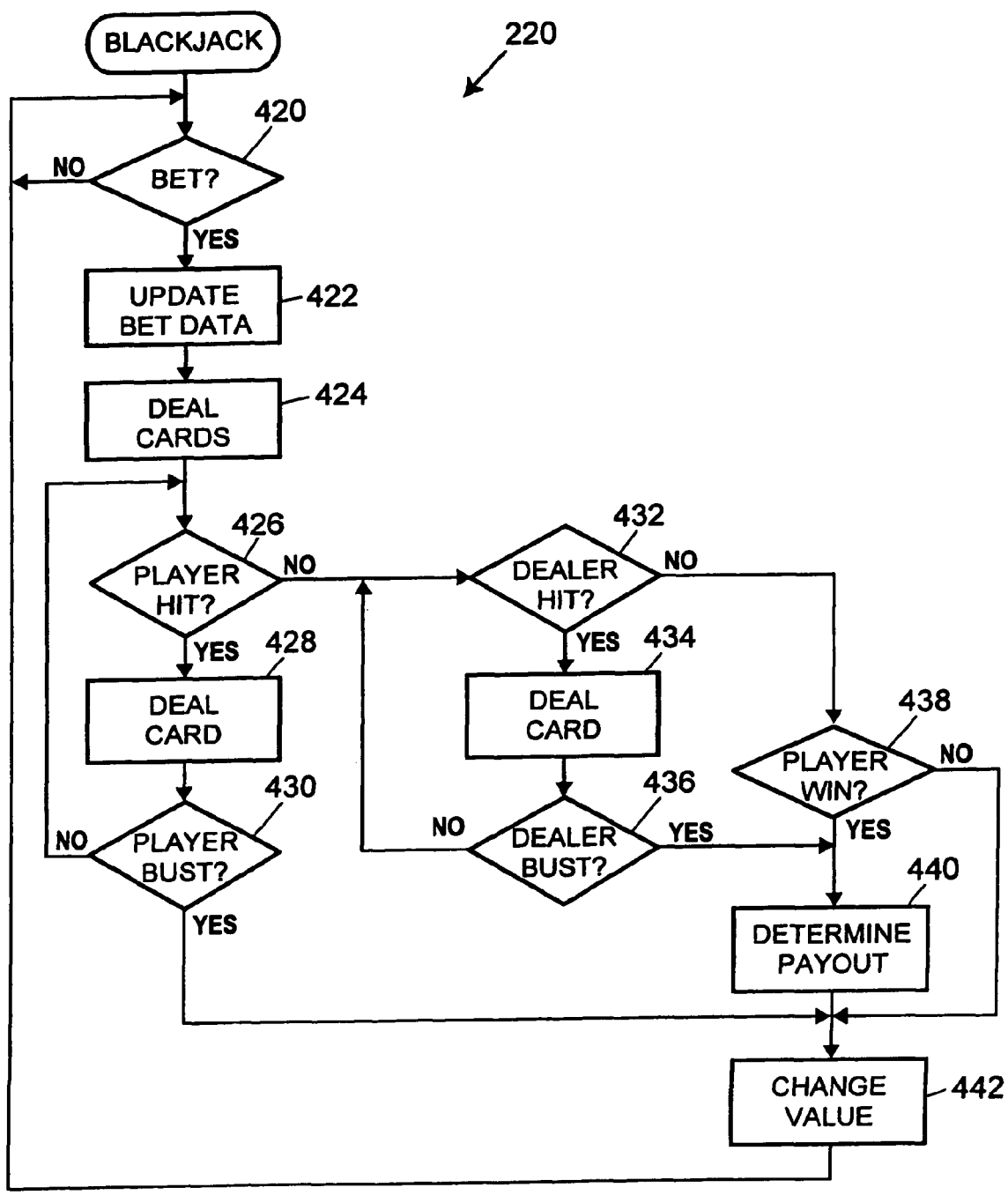
FIG. 10 is a flowchart of a video blackjack routine that may be performed by one or more of the gaming units, in accordance with one embodiment of the present invention.

FIG. 10 is a flowchart of the video blackjack routine 220 shown schematically in FIG. 4. Referring to FIG. 10, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 8).

Slots

Figure 11:
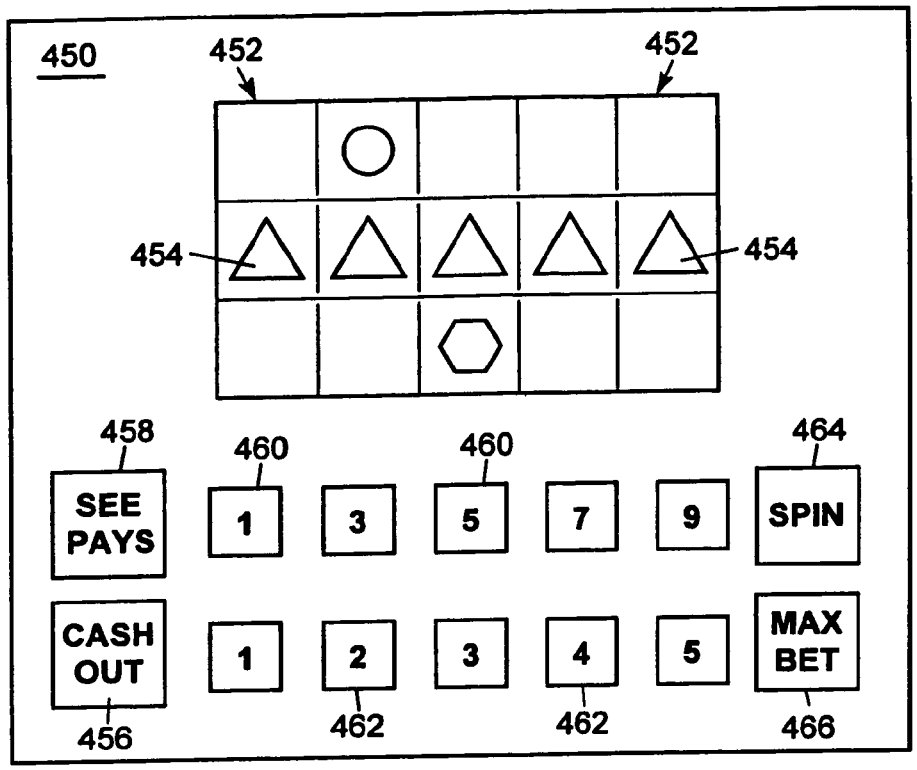
FIG. 11 is an illustration of a visual display that may be displayed during performance of the slots routine of FIG. 13, in accordance with one embodiment of the present invention.

FIG. 11 is an exemplary display 450 that may be shown on the display unit 70 during performance of the slots routine 230 shown schematically in FIG. 4. Referring to FIG. 11, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 13:
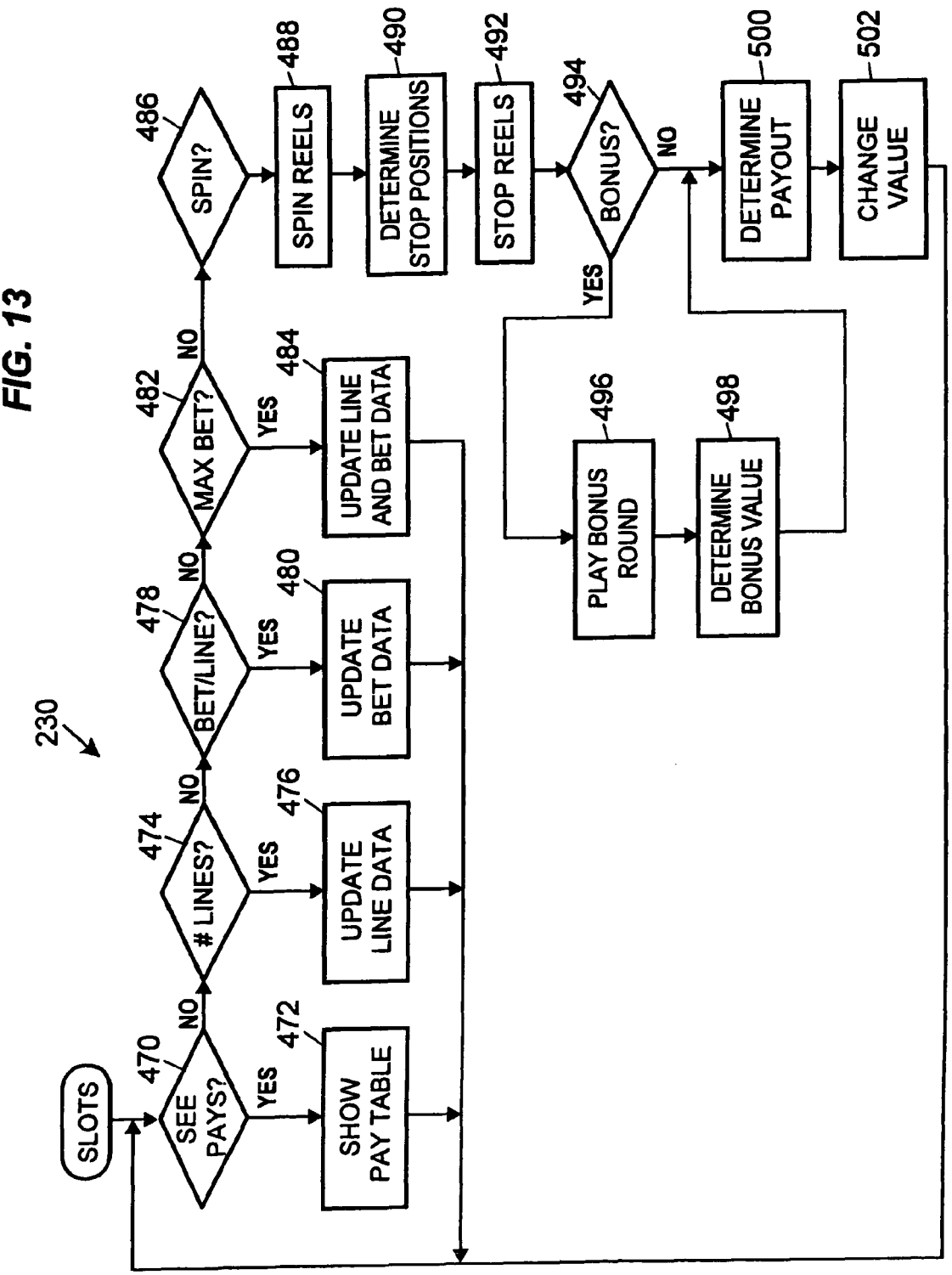
FIG. 13 is a flowchart of a slots routine that may be performed by one or more of the gaming units, in accordance with one embodiment of the present invention.

FIG. 13 is a flowchart of the slots routine 230 shown schematically in FIG. 11. Referring to FIG. 13, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline information and bet-per-payline information) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

Figure 12:
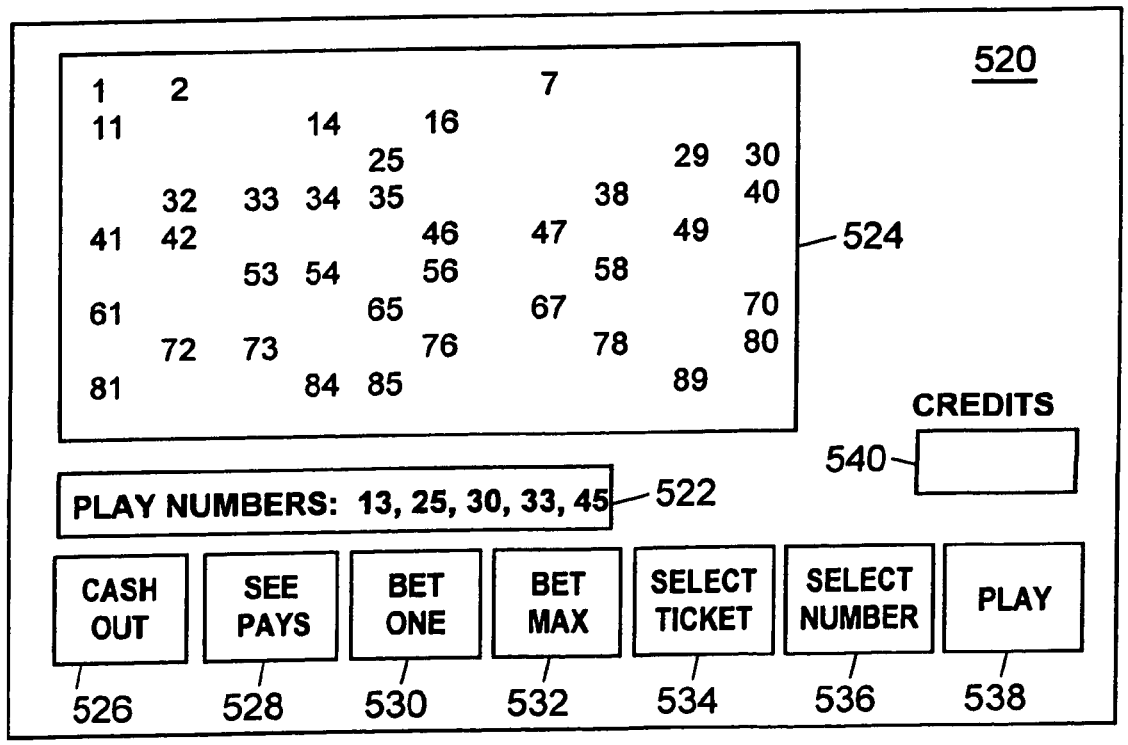
FIG. 12 is an illustration of a visual display that may be displayed during performance of the video keno routine of FIG. 14, in accordance with one embodiment of the present invention.

FIG. 12 is an exemplary display 520 that may be shown on the display unit 70 during performance of the video keno routine 240 shown schematically in FIG. 4. Referring to FIG. 12, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 14:
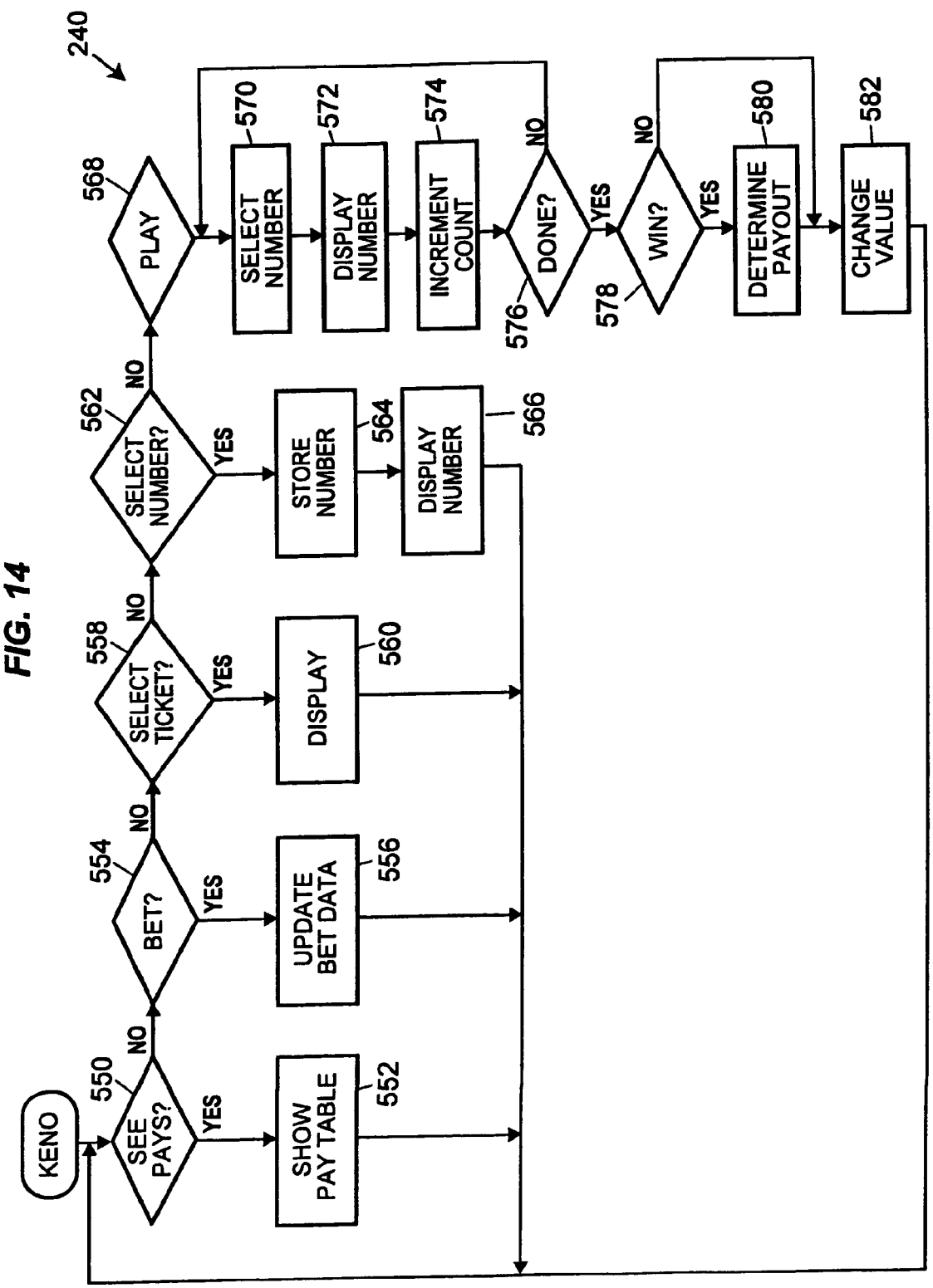
FIG. 14 is a flowchart of a video keno routine that may be performed by one or more of the gaming units, in accordance with one embodiment of the present invention.

FIG. 14 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 14, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the gaming system operator. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the gaming system operator may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 12).

Video Bingo

Figure 15:
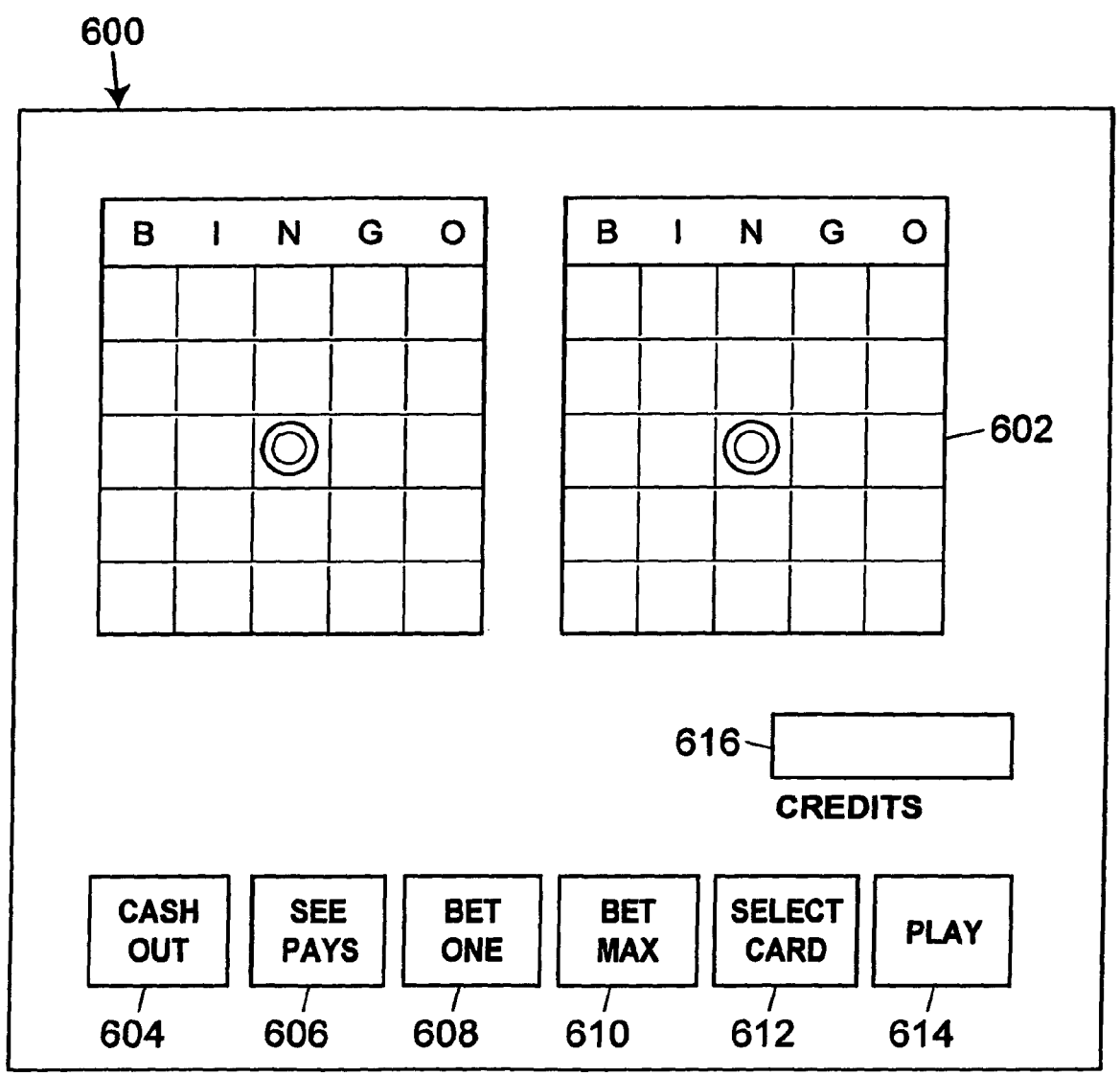
FIG. 15 is an illustration of a visual display that may be displayed during performance of the video bingo routine of FIG. 16, in accordance with one embodiment of the present invention.

FIG. 15 is an exemplary display 600 that may be shown on the display unit 70 during performance of the video bingo routine 250 shown schematically in FIG. 4. Referring to FIG. 15, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 16:
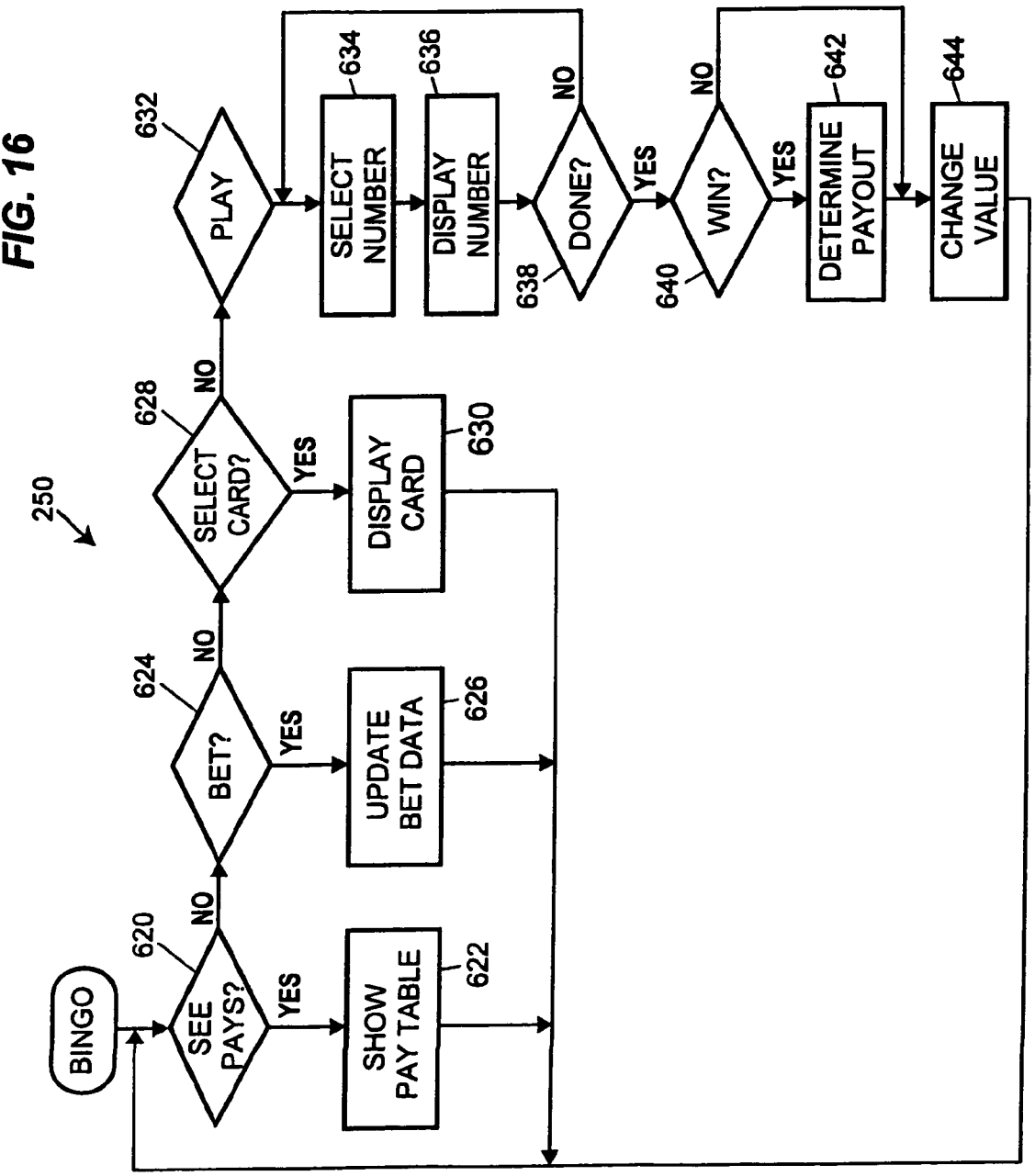
FIG. 16 is a flowchart of a video bingo routine that may be performed by one or more of the gaming units, in accordance with one embodiment of the present invention.

FIG. 16 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 16, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 15).

The invention also pertains to techniques for distributing large payouts without interrupting a gaming session. The gaming session may be associated with a variety of gaming apparatuses including for example those found on a gaming operator's property and those found outside the gaming operator's property. In most cases, the gaming apparatuses are dedicated gaming devices such as gaming machines, handheld portable game players and/or the like. In other cases, however, the gaming apparatuses may also correspond to other devices capable of playing games of chance such as PDAs, PCs and the like. In fact, the gaming apparatus may correspond to any of those devices used in online gaming. Furthermore, the gaming apparatus may be associated with other forms of gaming including gaming tables, etc.

Generally speaking, gaming apparatus refers to any system associated with game play including for example receiving credit, inputting data into a game, processing the results of the game, outputting both the game and the results of the game, recording the results of the game, monitoring the game, paying out the game, and the like.

Although the techniques described herein can be applied to any gaming arrangement so as to prevent interruptions of the gaming session associated therewith (as described above), for ease of discussion, in some cases the invention will be described in context of a gaming device such as a gaming machine or portable game player. It should be appreciated however that this is not a limitation and the invention goes beyond these limited embodiments. That is, the invention can be used to distribute payouts/rewards to any gaming system/apparatus whether remote or in a gaming environment.

One aspect of the invention relates to ensuring separation between current credits and a jackpot and issuing a redemption certificate (whether electronic or physical) for the value of a jackpot when a large jackpot is won. The certificate is only redeemable at an appropriate location (whether electronic or physical) to ensure that the required forms are filled out. In the case of a gaming device, this may include automatically printing out a voucher or check or ticket in the amount of the jackpot and then immediately resetting the gaming machine to the current credits when a large jackpot is won. The voucher is only redeemable at a cashier window or other appropriate location such as a manned or unmanned redemption kiosk to ensure that the required forms are filled out (e.g., the forms are filled out in order to receive payment).

Another aspect of the invention relates to separating or partitioning the payout from the current credits and storing the payout locally at a gaming apparatus such as a gaming machine. The payout (or payouts) is held in storage until the game session ends thereby allowing the player to continue play without interruption. The stored payout is typically controlled by a governing agent so as to maintain integrity of the system. This technique may also include capturing a signature or other indicia from the player at the time of the win to ensure the current player is the same player that claims the payout at the end of the gaming session.

Another aspect of the invention relates to obtaining the player's identification (either at the start of the gaming session or after the win), notifying a host system that the identified player has won the payout so that the required forms can be filled out away from the gaming apparatus and issuing the payout to the player as for example by resetting the credit meter to include the payout. In this implementation, the forms are filled out according to a stored user's profile associated with the user's ID. This technique may also include capturing a signature or other indicia from the player to authenticate the players identification.

Another aspect of the invention relates to obtaining the player's identification, storing the payout in account assigned to the player ID at a host system (increasing the account in accordance with the amount won) and continuing the gaming session with the current credits. In the case of a gaming device such as a gaming machine, the credit meter may be reset to the current credits. When the game session ends, the player fills out the forms and claims their prize. For example, the player may proceed to a cashier window to claim their prize and fill out the required forms (e.g., W2-G forms) associated with the payout(s).

Yet another aspect of the invention relates to electronically filling out the required forms, obtaining the required signature authority for the forms, and electronically filing the forms.

These and other embodiments of the invention are discussed below with reference to FIGS. 17-23. However, those skilled in the art will readily appreciate that the detailed description given herein with respect to these figures is for explanatory purposes as the invention extends beyond these limited embodiments.

Figure 17:
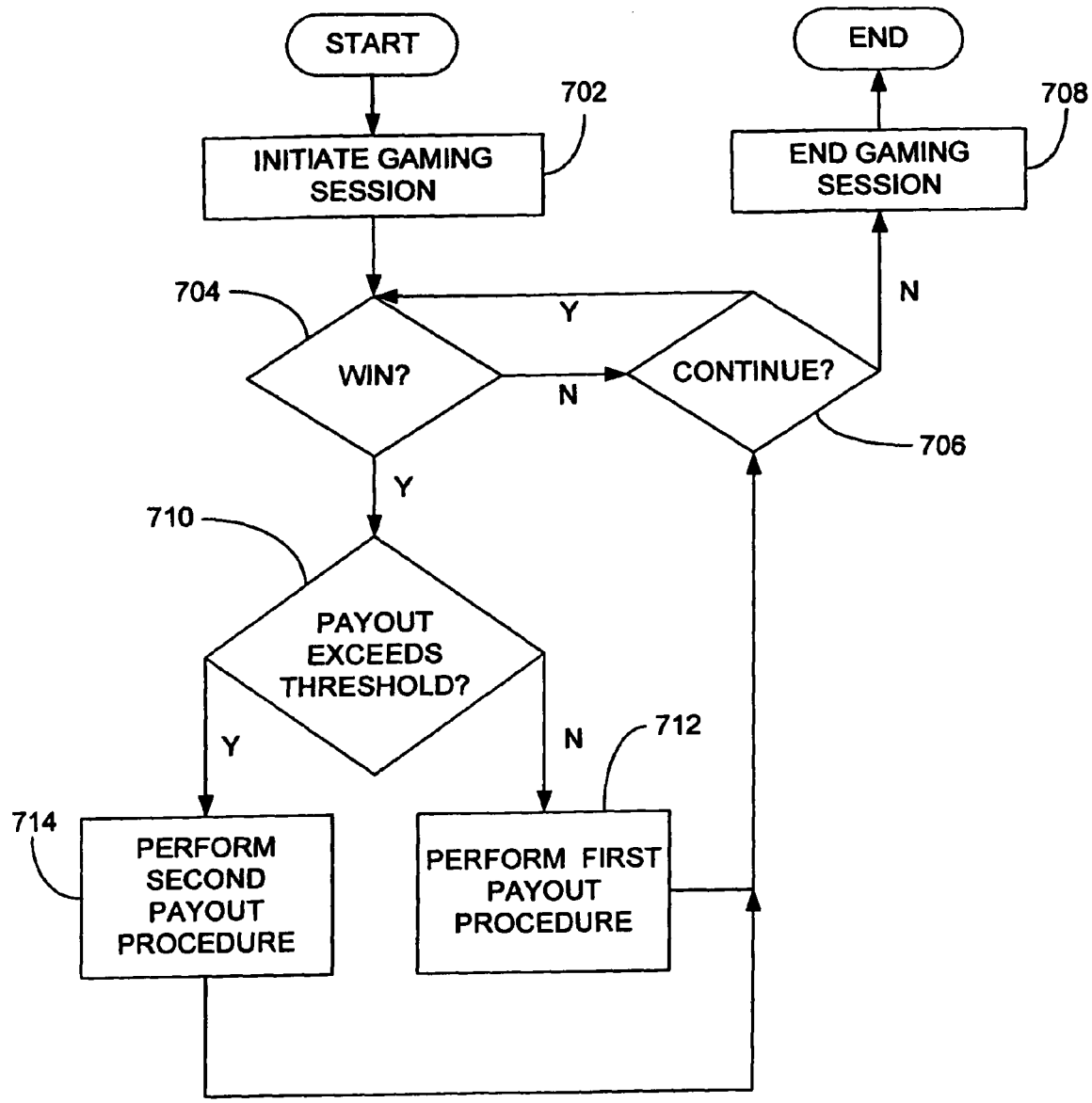
FIG. 17 is a method operating a gaming apparatus, in accordance with one embodiment of the present invention.

FIG. 17 is a method 700 operating a gaming apparatus, in accordance with one embodiment of the present invention. The method may be applied to a wide variety of gaming systems/arrangements. The gaming apparatus may for example refer to a casino gaming device, an online gaming device, a casino table game, and/or the like.

The method 700 begins at block 702 where a gaming session is initiated. For example, a game player provides credits and plays games. During the gaming session, in block 704, a determination is made as to whether a game has resulted in a win or a loss. If a loss, the method 700 proceeds to block 706 where a determination is made as to whether the gaming session should continue. For example, whether there are enough credits or whether the player desired to keep playing. If yes, the method 700 proceeds back to block 704. If no, the method 700 proceeds to block 708 where the gaming session ends. Typically, in block 708, the credits are cashed out if there are credits remaining at the gaming apparatus. By way of example, coins or tokens may be dispensed into a hopper or a ticket may be printed.

If a win is determined in block 704, the method 700 proceeds to block 710 where a determination is made as to whether the payout associated with the win exceeds a predetermined threshold. The predetermined threshold may be an amount associated with tax regulations for one or more jurisdictions including city, state, federal, and international jurisdictions (players may be located anywhere in the world). In fact, jurisdictional checking may be required to ensure compliance. By way of example, the predetermined threshold may be based on a W2-G event. At the time of this writing, in the USA, a W2-G event appears to be set at $1200.00 by the IRS.

If the win is not above the threshold, the method 700 proceeds to block 712 where a first payout procedure is performed. This typically includes issuing the payout amount or reward to the winning player. For example, the payout amount may be added to the current credits or possibly coins or tokens or tickets are dispensed from gaming apparatus.

Thereafter, the method 700 proceeds to block 706. If the win is above the threshold, the method 700 proceeds to block 714 where a second payout procedure is performed with limited or no interruption to the gaming session. For example, the gaming session is allowed to proceed without stopping for the required documentation (e.g., W2-G forms). For example, in a gaming machine, the gaming machine is not locked up and an operator is not required to attend to the machine. Instead, other techniques are performed to ensure among other things that the required forms are filled out.

In one implementation, block 714 includes printing out a voucher or check that is only redeemable at a cashier window and then immediately resetting the gaming apparatus to the current credits (e.g., credits before the win) when the jackpot occurs. As a result, the player is allowed to continuously play games without interruption. When the game session ends, the player takes the voucher (or vouchers) to a cashier window to receive their payout(s) and fill out the required forms (e.g., W2-G forms) associated with the payout(s). Alternatively, once the forms are completed, the cashier may modify the voucher so that it can be exchanged for cash (at another time) or inserted into a bill acceptor of a gaming machine to provide credits to the credit meter (e.g., enable the voucher for other uses).

In another implementation, block 714 includes separating or partitioning the payout from the current credits and storing the payout locally at the gaming apparatus. The payout (or payouts) is held in storage until the game session ends. At this point, the player may opt for a printed voucher that is only redeemable at a cashiers window. Alternatively, the player or gaming apparatus may opt for a hand pay. Also alternatively, the player or gaming apparatus may opt to fill at the required forms at the gaming apparatus using for example a user interface of the gaming apparatus in order to receive a voucher that is redeemable at a cashier or other gaming apparatus.

In another implementation, block 714 includes obtaining the player's identification (either at the start of the gaming session or after the win), notifying a host or governing system that the identified player has won the payout (payout is tied to ID and a record is made) and resetting the credits of the gaming apparatus with the payout. By way of example, the governing system may be a server operatively coupled to the gaming apparatus. Because the win is tied to a particular user and a record has been made in a governing system, the game session is allowed to continue without interruption. Furthermore, the jackpot can be added to the credits as for example the credit meter of a gaming machine.

In one embodiment of this implementation, the required forms are filled out according to a user's profile associated with the user's ID. The user's profile includes all the required information including for example name, social security number, home address, etc. The user's profile may for example be stored in a database of the governing system or a player tracking card or some other form of identification that is read by the gaming machine. The forms may be filled out automatically by the host or governing system (or possibly the gaming apparatus) and/or manually by an operator located away from the gaming apparatus (either concurrently with the gaming session or at some other time after the gaming session). To further enhance this technique, the forms may be electronically filed when they completed using for example a digital signature stored as part of the user profile, and a receipt may be printed so that the player has a record of the filing event. Alternatively or additionally, the receipt may be sent to the player as for example via email, traditional mail or other related means. Email may be an appropriate receipt for online gaming situations. In addition to the receipt, copies of the filed forms as well as gambling loss statements (which may be used for tax returns) may also be issued physically or electronically to the player.

In most cases, some sort of authentication is required at the gaming apparatus at the time of the win to ensure the player is who he says he is. By way of example, the user may be authenticated using a picture, thumb print, retinal scan, password, signature and/or the like, taken immediately after the win at the gaming apparatus. This indicia may be compared to a stored indicia as part of the user profile. If a match, the gaming session proceeds immediately. If no match, the gaming machine is placed in a hand pay mode where the game is locked and an operator is required to help the player.

In another implementation, block 714 includes obtaining the player's identification (either at the start of the gaming session or after the win), storing the payout in account assigned to the player ID at a host or governing system (increasing the account in accordance with the amount won) and resetting the gaming apparatus to the current credits. When the game session ends, the player proceeds to a cashier window and presents identification to claim their prize and fill out the required forms (e.g., W2-G forms) associated with the payout(s). In some cases, the required forms may already be filled out using a user profile. As such, the player only has to look over the forms and sign his name thereby saving time.

In yet another implementation, block 714 may include presenting the player with payment options. For example, asking the player if they would like to continue playing or quit the gaming session at the time of the jackpot. If the player decides to continue they may be presented with the voucher option and the identification option mentioned above in order to immediately continue the gaming session. The most that may be required of the player is a swipe of their player tracking card or other identification (e.g., license) as well as providing some sort of authentication. If the player decides to quit, they may be presented with a hand pay option, a voucher option, or an identification option. Alternatively, they may even be able to fill in the required forms at the gaming apparatus using the user interface of the gaming apparatus in order to receive a voucher that is redeemable at other gaming apparatuses.

Figure 18:
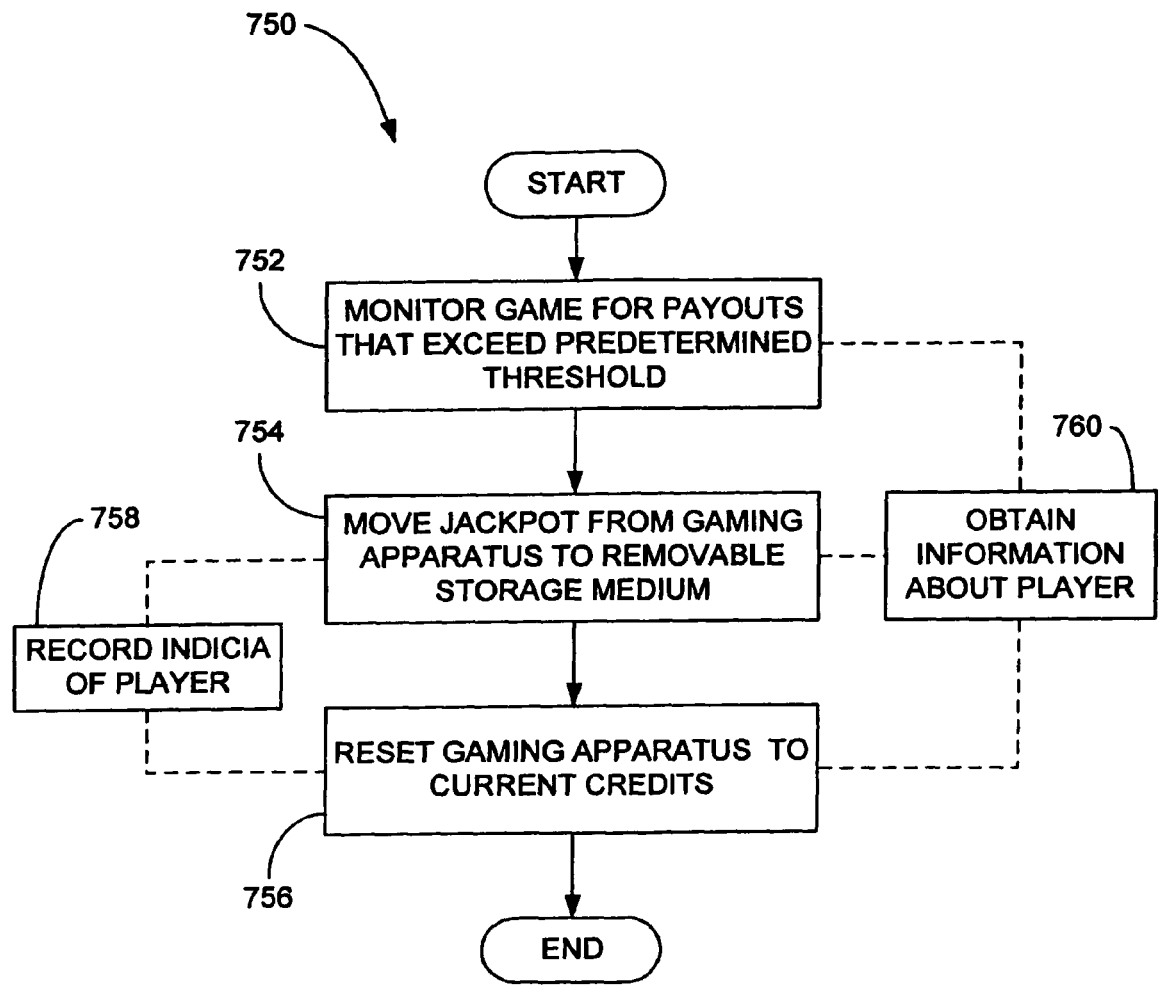
FIG. 18 is a method for distributing a large payout without interrupting a gaming session, in accordance with one embodiment of the present invention.

FIG. 18 is a method 750 for distributing a large payout without interrupting a gaming session, in accordance with one embodiment of the present invention. By way of example, the method may correspond to block 714 of FIG. 17. The method 750 generally begins at block 752 where games are monitored for payouts that exceed a predetermined threshold. The monitoring may be performed locally at the gaming apparatus and/or by a host system of the gaming apparatus as for example a governing server. The threshold may for example correspond to the limit provided by tax regulations (e.g., W2-G). By way of example, the predetermined amount may correspond to $1200.00.

Unlike a small jackpot, the large jackpot is not added to the player's currents (e.g., credit meter or dispensed into the hopper). Instead, in block 754, the value of the jackpot is removed from the gaming apparatus and downloaded into a removable storage medium that is issued to the player. The removable storage medium may for example be a printed ticket or voucher or possibly a card that is only redeemable at a cashiers window so that the required forms associated with the large payout can be filled out by the player when they decide to receive their payout.

At the same time (or soon thereafter), in block 756, the gaming apparatus is reset to the current credits thereby enabling a player to continue their gaming session. When the game session ends, the player (at their leisure) takes the removable storage medium to a cashier window to receive there payout(s) and fill out the required forms (e.g., W2-G forms) associated with the payout(s). Alternatively, once the forms are completed, the cashier may modify the removable storage medium so that it can be exchanged for cash (at another time) or inserted into a bill acceptor of a gaming apparatus or possibly a card reader to provide credits to the credit meter (e.g., enable the voucher for other uses).

In order to ensure that the player at the time of the win is the same one redeeming the payout, the method 750 may additionally include an additional step of recording an indicia of the player at the time of the win (block 758). This is generally accomplished before the gaming session is reset. By way of example, the gaming apparatus may include a means for recording a signature, taking a picture, recording a thumb print, etc. These indicia can be compared to the redeemer's indicia in order to ensure the forms are being filled out by the correct person. The recorded data may be electronically or physically embedded on the removable storage medium, or alternatively, the information may be stored at the gaming apparatus or sent to a governing authority such as a governing server system connected to the gaming apparatus. In any of these cases, the cashier is able to retrieve the stored indicia from the respective mechanism in order to compare it to the redeemer. The comparison may be made by the operator or through a software agent set up to make the comparison.

Furthermore, in order to provide increased security, the method 750 may additionally include, at block 760, obtaining information about the player including for example name, social security number, address, etc. By way of example, this may be accomplished with a player tracking card, driver's license or other identification. Alternatively, this may be accomplished with a user interface of the gaming apparatus (e.g., physical keyboard or touch screen keyboard). This data may be electronically or physically embedded on the removable storage medium, or alternatively, the information may be stored at the gaming apparatus or sent to a governing authority such as a governing server system connected to the gaming machine. At least a portion of this information may be physically or electronically embedded on the ticket.

In one embodiment, the removable storage medium is a ticket that is printed by a printer at the gaming apparatus. At the very least, the payout amount is printed on the ticket both with a bar code and a numeric amount. A validation number may be used for tracking purposes in order to prevent a player from cashing the same ticket more than once. The ticket may also include a gaming venue that refers to the property where the ticket was printed. The ticket may also include a machine ID number that identifies the machine where the ticket was printed. The ticket may also include a print date and time that notes the exact date and time the ticket was printed. The ticket may also include a validation period that indicates a period of time the ticket is valid. The ticket may also include venue logos or other information identifying the location where the ticket was printed. The ticket may additionally include a statement that the ticket is only redeemable at a cashiers window and that various forms will be required to be filled out at the time the ticket is paid. The ticket may further include an indicia of the player at the time of the win including for example a picture, signature, thumb print, and/or the like. The ticket may further include information about the player including name, address, etc.

In another embodiment, the removable storage medium is a card that is either issued at the gaming apparatus or one that was previously presented. Unlike the printed ticket, the card includes a magnetic strip that holds the numeric amount of the payout as well as other information including for example validation number, gaming venue, machine ID, issue date and time, validation period, and the winners indicia. The card itself may include venue logos or other information identifying the location where the card was issued. In some cases, the card is a paper card. The paper card may for example be issued by the gaming machine, and may in some cases include printed subject matter similar to the ticket. One example of a paper card are those cards used in subway systems. In other cases, the card is a plastic card similar to a debit or credit card. In one implementation, the card is a player tracking card. In another implementation, the card is a smart card.

Figure 19:
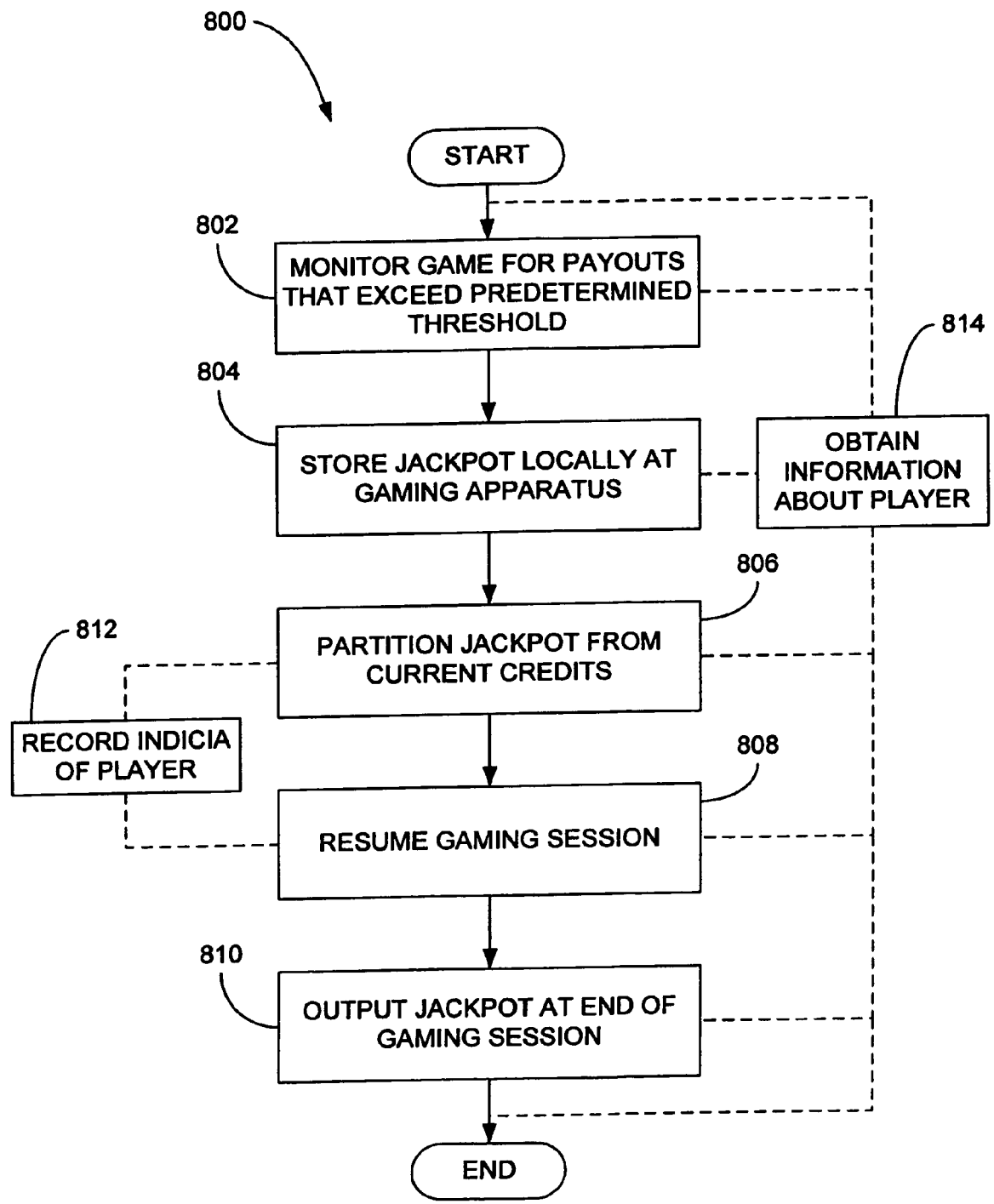
FIG. 19 is a method for distributing a large payout without interrupting a gaming session, in accordance with one embodiment of the present invention.

FIG. 19 is a method 800 for distributing a large payout without -interrupting a gaming session, in accordance with one embodiment of the present invention. By way of example, the method may correspond to block 714 of FIG. 17. The method 800 generally begins at block 802 where games are monitored for payouts that exceed a predetermined threshold. The monitoring may be performed locally at the gaming apparatus and/or by a host system of the gaming apparatus as for example a governing server. The threshold may for example correspond to the limit provided by tax regulations (e.g., W2-G). By way of example, the predetermined amount may correspond to $1200.00.

If a payout exceeds the predetermined threshold, the method 800 proceeds to block 804 where the jackpot is stored locally at the gaming apparatus and block 806 where the jackpot is partitioned from the current credits. That is, the jackpot is not added to the credits, but rather kept separate from the credits. The jackpot (or jackpots) is held in storage until the game session ends (block 806). At the end of the gaming session (block 808), the player or gaming apparatus outputs the jackpot in accordance with regulations. The player or gaming apparatus may opt for one or more printed vouchers that are only redeemable at a cashiers window. Alternatively, the gaming apparatus or player may opt for a hand pay where the gaming operator come to the machine with the forms. Also alternatively, the player or gaming apparatus may opt to have the required forms filled out at the gaming machine using for example a user interface of the gaming apparatus in order to receive a voucher that is redeemable at gaming apparatuses.

Like the method mentioned above, in order to ensure that the player at the time of the win is the same one receiving the payout, the method may additionally include an additional step of recording the identity of the player at the time of the win (block 812). This is generally accomplished before the gaming session is allowed to continue. By way of example, the gaming apparatus may include a means for recording a signature, taking a picture, recording a thumb print, etc. These indicia can be compared to the redeemers indicia in order to ensure the forms are being filled out by the correct person.

Figure 20:
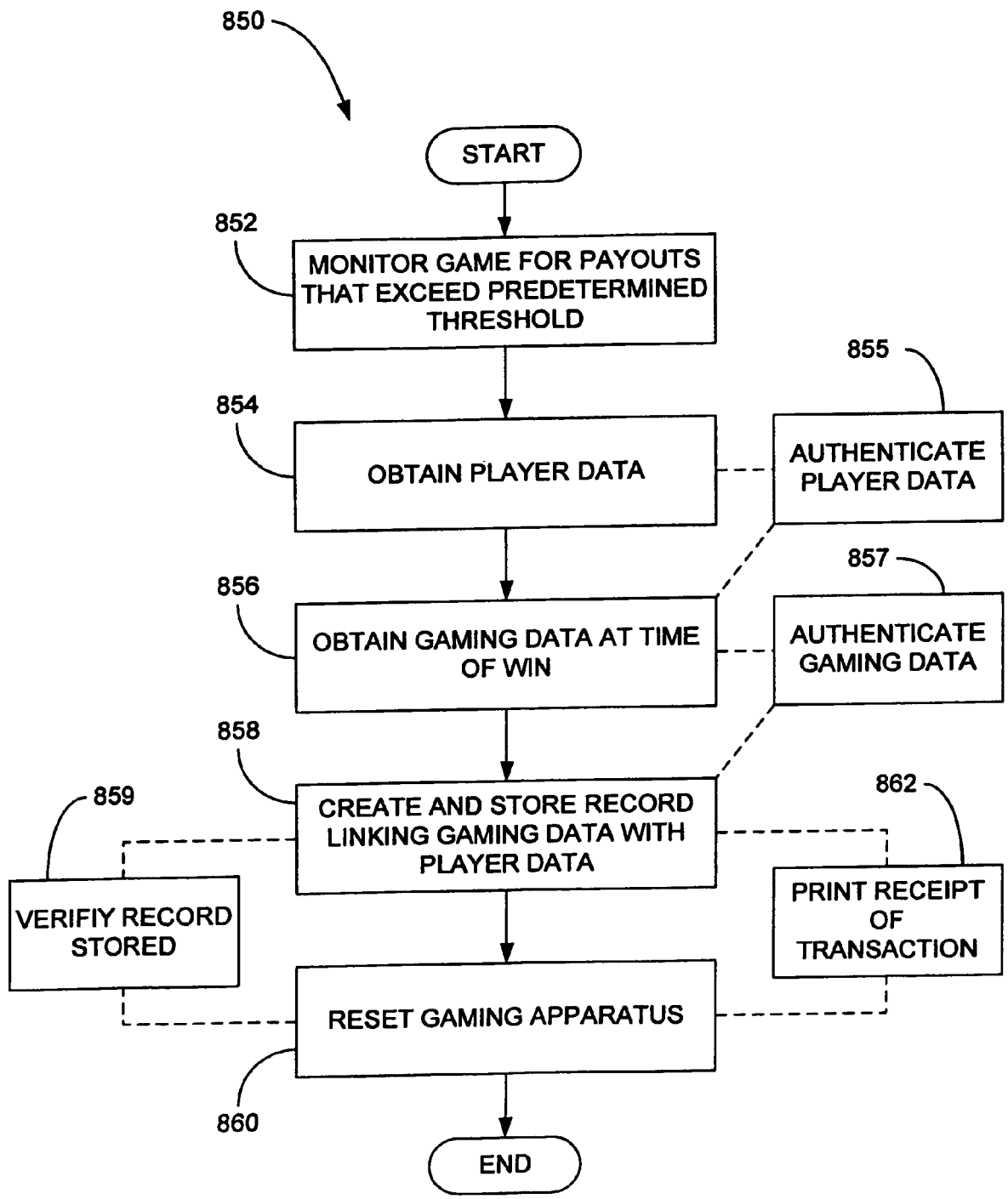
FIG. 20 is a method for distributing a large payout without interrupting a gaming session, in accordance with one embodiment of the present invention.

FIG. 20 is a method 850 for distributing a large payout without interrupting a gaming session, in accordance with one embodiment of the present invention. By way of example, the method may correspond to block 714 of FIG. 17. The method 850 generally begins at block 852 where games are monitored for payouts that exceed a predetermined threshold. The monitoring may be performed locally at the gaming apparatus and/or by a host system of the gaming apparatus as for example a governing server. The threshold may for example correspond to the limit provided by tax regulations (e.g., W2-G). By way of example, the predetermined amount may correspond to $1200.00.

If a payout exceeds the predetermined threshold, the method 850 proceeds to block 854 where player data is obtained. The player data may be obtained prior to the winning jackpot or at the time of the winning jackpot (immediately after the jackpot is won). The player data may include for example include name, address, social security number, a means for authenticating the player with the player data, and the like. The player data may be provided by a card such as a player tracking card, license or other identification card. The player data may also be obtained from a database once a player is identified using a card, user interface of the gaming apparatus, or other means. The player data may also be entered at the gaming apparatus using the user interface of the gaming apparatus (e.g., they may be presented with ID fields, and a QWERTY touch screen may be used for filling in the ID fields).

In most cases, the method additionally includes an authentication block 855 following block 854. In authentication block 855, player authentication is performed in order to ensure the obtained player data corresponds to the player that won the jackpot. This may be accomplished using a variety of techniques including but not limited to obtaining a picture, thumb print, retinal scan, password, signature and/or the like of the winner and matching it to a corresponding indicia stored as part of the player data. If there is no match, the gaming apparatus may be required to interrupt the gaming session (e.g., go into a hand pay mode). If there is a match, the method is allowed to proceed.

The method 850 also includes block 856 where the gaming data at the time of the jackpot is obtained. The gaming data may include among other things the payout amount and the amount of the bet. It may also include a gaming venue identifier that refers to the property where the jackpot was won, and an ID number that identifies the apparatus where the jackpot was won. The gaming data may also include the exact date and time of the win.

In most cases, the method 850 additionally includes an authentication block 857 following block 856. In authentication block 857, the integrity of the gaming data is checked. For example, the machine code is authenticated and the win is verified. This may be accomplished using a variety of techniques which are well known to those skilled in the art. If for some reason, authentication fails, the gaming apparatus may be required to interrupt the gaming session (e.g., go into a hand pay mode).

Once the player data and gaming data are obtained, the method proceeds to block 858 where a record is created and stored linking the gaming data and player data together. Although this may be accomplished at the gaming apparatus, it is typically accomplished by a host system that governs the gaming apparatus. For example, the host system may store the record in one of its databases.

Because the win is tied to a particular user and a record has been made, the method 850 continues to block 860 where the credits of the gaming apparatus are reset.

In one embodiment, the credits are reset by adding the jackpot to the current credits (or alternatively cashed out). This allows a user to continue playing with the payout included in the credits (e.g., credit meter). In this embodiment, the required forms may be automatically obtained, filled out and electronically filed at the various agencies using player data and gaming data. The automated filing frees the player and operator from this time consuming process.

In another embodiment, the credit meter is reset to the current credits and the payout is stored locally or at a host system. The payout can therefore be received at the end of the gaming session. For example, in the case of the host system, the payout may cleared from the gaming apparatus, and stored in an account assigned to the player ID at a host or governing system (increasing the account in accordance with the amount won). When the game session ends, the player proceeds to a cashier window to claim their prize that is stored in an account assigned to them and fill out the required forms (e.g., W2-G forms) associated with the payout(s). Alternatively, in the case of local payouts, the payout may be partitioned from the current credits. When the game session ends, the player can select a hand pay, printed ticket, etc.

In most cases, the method 850 further includes an intermediate block 859 between blocks 858 and 860. This block includes verifying that the record was properly stored. For example, if stored at a host system, the host system may send an acknowledgement command to the gaming apparatus indicating that the record was received and stored. If it is not verified, the gaming apparatus may be required to interrupt the gaming session (e.g., go into a hand pay mode).

The method 850 may also include an additional block 862 where a receipt of the transaction is printed at the gaming apparatus so that the player has a physical record of the event. Alternatively or additionally, the receipt may be sent to the player as for example via email, traditional mail or other related means. Email may be an appropriate receipt for online gaming situations. In addition to the receipt, copies of the filed forms as well as gambling loss statements (which may be used for tax returns) may also be issued physically or electronically to the player.

In one set-up of the embodiment mentioned above, the record is sent to or generated at a host system where it is stored. In this embodiment, the host system may send an acknowledgement command to the gaming apparatus indicating that it has received or generated as well as stored the record. The gaming apparatus after receiving the acknowledgement command, prints or sends a receipt so the player has a record of the event and resets the credit meter according to instructions (e.g., apply jackpot to current credits).

Figure 21:
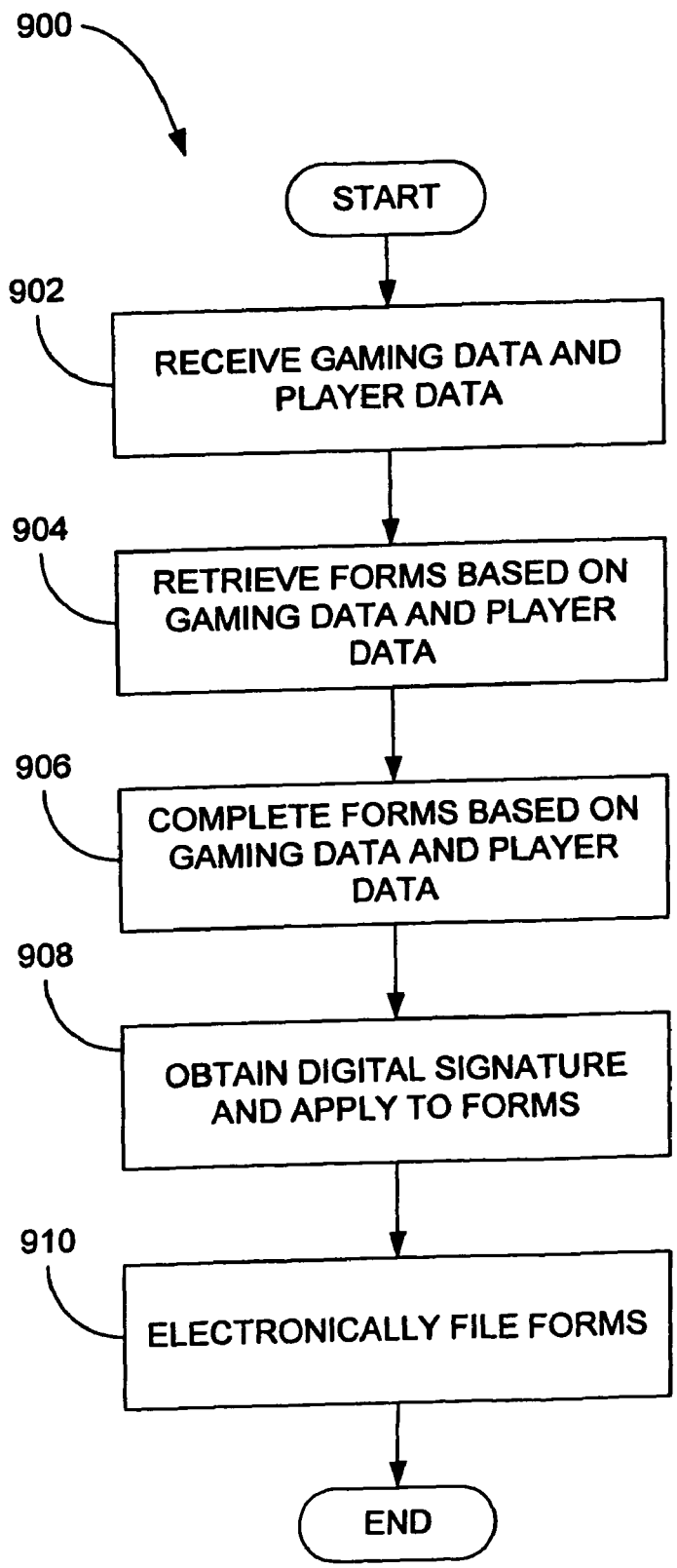
FIG. 21 is a method for automatically filing forms associated with a large jackpot, in accordance with one embodiment of the present invention.

FIG. 21 is a method 900 for automatically filing forms associated with a large jackpot, in accordance with one embodiment of the present invention. By way of example, the method 900 may be utilized in the method described and shown in FIG. 4 (e.g., once the record is stored).

The method 900 generally begins at block 902 where player and gaming data associated with a large jackpot is received. The player and gaming data may for example be received by a host system from a gaming apparatus when a large jackpot is won.

Following block 902, the method proceeds to block 904 where the required forms are retrieved based on the gaming and player data. The required forms may for example be stored in a database connected to the host system.

Following block 906, the method proceeds to block 906 where the required forms are filled out using the gaming and player data. For example, the data may be in an electronic format capable of being applied to an electronic form.

Following block 906, the method proceeds to block 908 where a digital signature of the player is obtained and applied to the appropriate forms. The digital signature may be captured at the time of the win using the user interface of the gaming machine, or alternatively it may be stored as part of a user profile in conjunction with a player tracking card or database. The digital signature comes with authorization from the player that won the jackpot that the forms may be electronically completed and filed. This authorization may be accomplished before or during a gaming session.

Following block 908, the method proceeds to block 910 where the completed forms are electronically filed at the agencies associated with the forms. The automated filing frees the player from interruptions of a gaming session and gaming experience and also frees casino operators from the hassle of filling out the forms.

Figure 22:
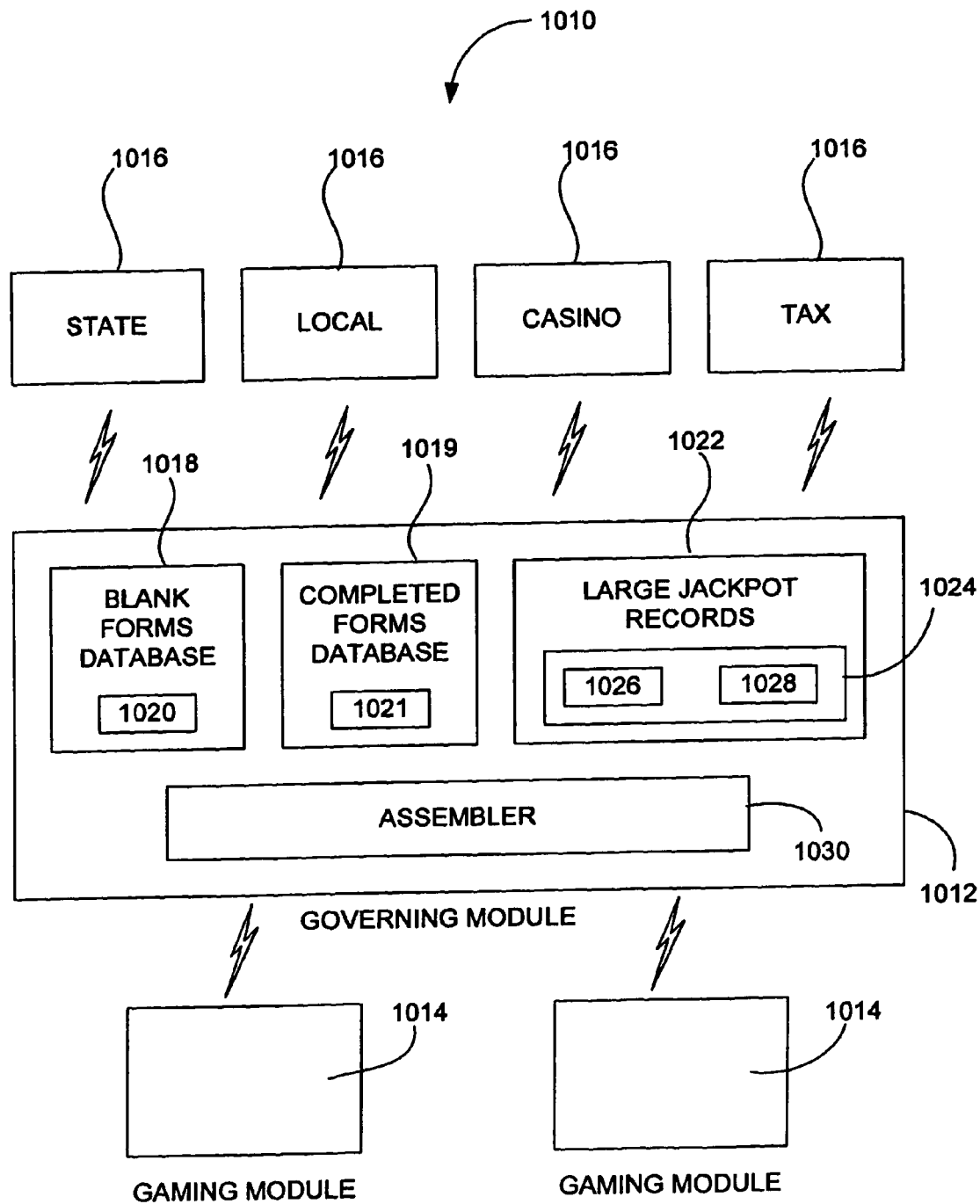
FIG. 22 is a diagram of a gaming system, in accordance with one embodiment of the present invention.

FIG. 22 is a diagram of a gaming system 1010, in accordance with one embodiment of the present invention. The gaming system 1010 includes a governing module 1012 that communicates with one of more gaming modules 1014. The governing module 1012 is configured to monitor the gaming module 1014 for payouts that exceed a predetermined threshold, to store gaming and player data associated with the win, to automatically complete the forms required for such payouts, and to automatically e-file the forms at the appropriate agencies 1016 that are in communication with the governing module 1012.

The governing module 1012 includes a forms database 1018. The forms database 1018 includes the forms 1020 necessary for payouts that exceed a predetermined threshold. Each of these forms is held in an electronic format, meaning that they can be filled out electronically. The forms database may include any of those forms necessary to satisfy the requirements of the agencies of a particular jurisdiction, or all the forms necessary to satisfy the requirements of all jurisdictions. The forms may for example include W2-G forms, W-9 forms, media release forms, primary jackpot report, primary jackpot hit report, questionnaires, lump sum/annuity form, state and local regulatory forms The host module 1012 also includes a jackpot record database 1022. The jackpot record database 1022 includes records 1024 of large payouts that require forms to be filled out. Each record 1024 typically includes a link to player data 1026 and gaming data 1028. The player data 1026 includes such things as name, address, social security, digital signature, etc., and the gaming data 1028 includes such things as numeric value of the payout, venue, machine ID, data and time of win, etc. Although not a requirement, the jackpot record database 1022 typically queues up each record 1024 in the order it was received or generated.

The governing module 1012 also includes an assembler 1030. The assembler 1030 retrieves the next record 1024 in a queued list of records from the jackpot records database 1022. The assembler 1030 reviews the gaming and player data

1026, 1028 of the retrieved record 1024, and based on the data retrieves the appropriate electronic forms 1020 from the forms database 1018. In cases where the forms are not contained in the forms database, the assembler may request or retrieve the form from the appropriate agency 1016. In some cases, the assembler 1030 retrieves all the forms at once, and in other cases selects one form at a time.

The assembler 1030 also completes the electronic forms 1020 using the player and gaming data 1026, 1028. For example, the assembler 1030 may pull the players name, address, social security number, and digital signature from the player data 1026 and place in the required fields of the electronic form 1020. The assembler may also pull the numeric value of the payout(s) from the gaming data 1028 and place in the required fields of the form 1020. The assembler 1030 may also implement any calculations that are necessary. For example, automatically withholding the prescribed amount of taxes. In some cases, the assembler 1030 may even pull the player's losses from the gaming data 1028 or other source and deduct this from the value of the payout to come up with the correct amount for a W2-G form.

Once the forms 1020 are completed, a copy of each form 1020 may be stored in a completed forms database 1019 with a link to the record that created the forms. In addition, a copy of each form 1020 is electronically sent to the appropriate agencies 1016. For example, the completed W2-G form is electronically sent to the IRS. In cases where the forms 1020 cannot be electronically filed, the forms 1020 may be forwarded via fax, and if not fax by printing and mailing.

The gaming system 1010 described above may be widely varied. The gaming system 1010 may be embodied as a single gaming machine that includes both the governing module 1012 and the gaming module 1014. The gaming system 1010 may also be embodied as a gaming network with server machines and remote client machines that communicate over wired or wireless connections. In one example, a server machine includes the host module and a remote client machine includes the gaming module (e.g., gaming server/gaming machine). In another example, the server machine includes both the host module and the gaming module and the remote client machine also includes the gaming module (e.g., gaming machine/wireless handheld gaming machine). It should be appreciated that any combination may be used.

Figure 23:
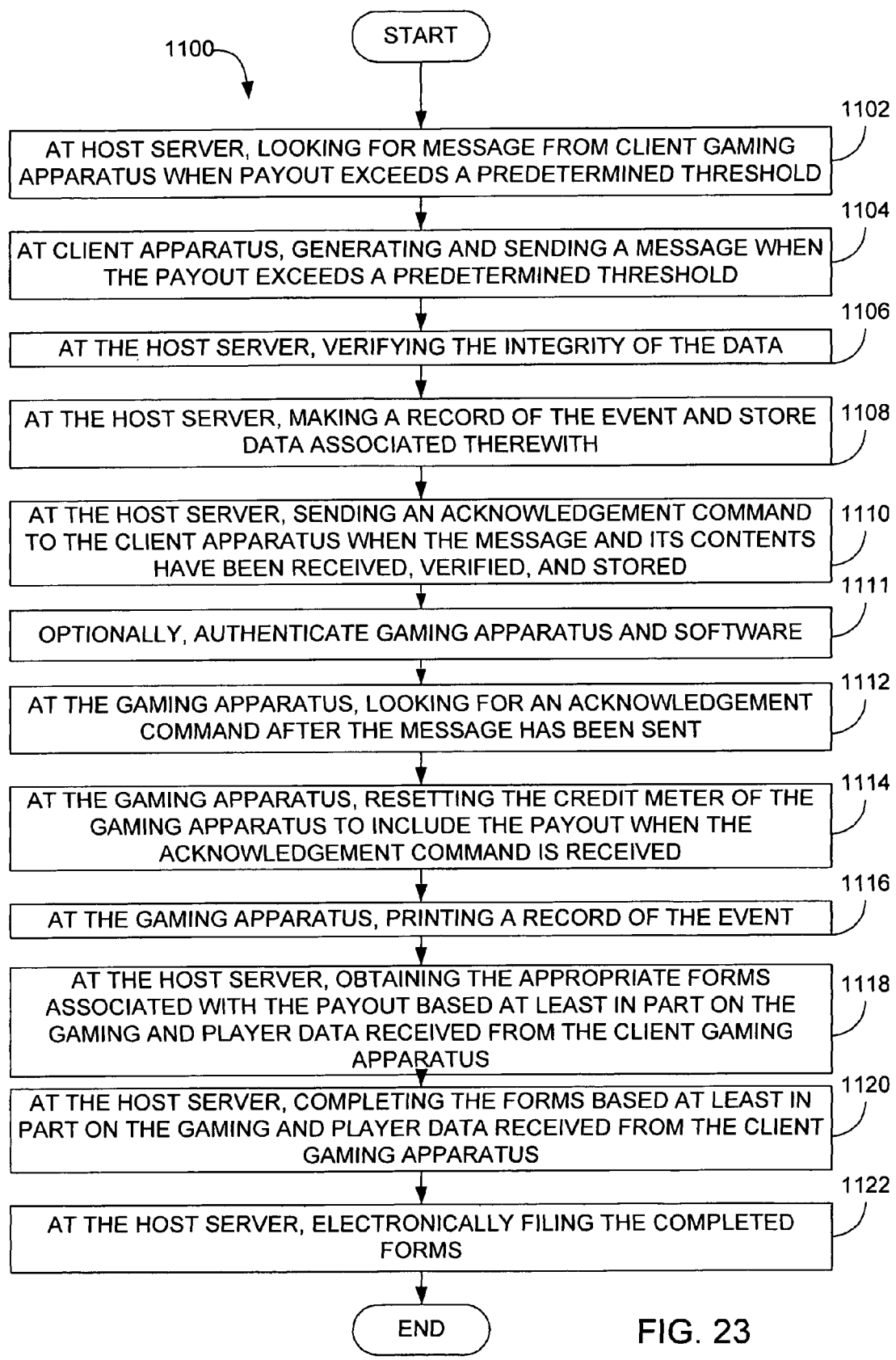
FIG. 23 is a method of administering payouts, in accordance with one embodiment of the present invention.

FIG. 23 is a method 1100 of administering payouts, in accordance with one embodiment of the present invention. The method is based on a server client relationship. For example, a host server and one or more client gaming apparatuses.

The method 1100 includes block 1102 where the host server looks for a message from the client gaming apparatus when a payout exceeds a predetermined threshold. The message includes gaming data and player data associated with the payout.

Along similar lines, the method 1100 also includes block 1104 where the client gaming apparatus generates and sends a message when a payout exceeds a predetermined threshold. The message includes gaming data and player data associated with the payout.

The method 1100 also includes block 1106 where the host server verifies the integrity of the data. For example, makes sure that the player data matches the player involved in the win and whether the client gaming apparatus as well as the gaming data can be trusted. Alternatively, the player data may be verified at the client gaming apparatus.

The method 1100 also includes block 1108 where the host server makes a record of the event and stores the data associated therewith.

The method 1100 also includes block 1110 where the host server sends an acknowledgement command to the client gaming apparatus when the message and its contents has been received, verified and stored. The acknowledgement command indicates that the client gaming apparatus can be reset. In some cases, the host instructs the client how to reset and in other cases, these instructions are generated at the client.

In some cases, the method 1100 may optionally include block 1111 where the gaming apparatus and software are authenticated. This may for example be accomplished when the jackpot is large (e.g., $1,000,000). In cases such as this, wins are typically certified by verifying the gaming apparatus has not been tampered with. This type of certification is typically not performed for smaller jackpots.

Along similar lines of block 1110, the method 1100 also includes block 1112 where the gaming machine looks for an acknowledgment command after a message is sent. The acknowledgement command indicates that the message was received, verified and stored. If an acknowledgement command is not received within a predetermined time period, the method may stop and proceed to a hand pay.

If a trusted transaction, the method 1100 also includes block 1114 where the gaming apparatus resets the credit meter of the gaming machine to include the payout when the acknowledgement command is received (e.g., adds the payout to the current credits).

The method 1100 also includes block 1116 where the gaming apparatus issues a record of the event. For example a receipt may be printed or sent to the user (e.g., email). In addition to the receipt, copies of the filed forms as well as gambling loss statements (which may be used for tax returns) may also be issued physically or electronically to the player.

The method 1100 also includes block 1118 where the host server obtains the appropriate forms associated with the payout based at least in part on the gaming and player data received from the client gaming apparatus.

The method 1100 also includes block 1120 where the host server completes the forms based at least in part on the gaming and player data received from the client gaming apparatus.

The method 1100 also includes block 1122 where the host server electronically files the completed forms at the appropriate agencies.

The invention is preferably implemented by hardware, software, firmware or a combination thereof. The software can also be embodied as computer readable code on a computer readable medium. The computer readable medium is any data storage device that can store data which can thereafter be read by a computer system. Examples of the computer readable medium include read-only memory, random-access memory, flash memory, CD-ROMs, DVDs, magnetic tape, optical data storage devices, and carrier waves. The computer readable medium can also be distributed over network-coupled computer systems so that the computer readable code is stored and executed in a distributed fashion.

The invention may be implemented via one or more software agents. Software agents are software entities that are capable of acting with a certain degree of autonomy in order to accomplish tasks on behalf of its user as for example a gaming device, system, server, program, etc. Generally speaking, software agents are computer programs. However, unlike most programs, software agents act in an intelligent manner making assumptions based on defined preferences or based on what they have learned by analyzing behavior. Software agents may for example have authority to decide when and if action is appropriate. They typically activate themselves, and perform their duties without human interaction. In essence, software agents are self contained entities capable of making independent decisions and taking actions to satisfy internal goals based upon their environment.

Because software agents are typically specialists, in some cases, it may be necessary to use multiple software agents in order to perform a series of tasks (software agents can communicate with other software agents). Furthermore, software agents are not only able to communicate with one another, but may also be configured to communicate with other programs such as host programs or server programs. Some examples of languages used to implement software agents include C++, Java, Unix, and the like.

It should be emphasized that although software agents are autonomous, software agents in important applications such as ones that deal with monetary transactions (e.g., gaming environments), are closely supervised by agencies or people that start them up, monitor and continually modify their behavior and shut then down when necessary. In fact, the agents can be monitored both locally and remotely. If the later, a governing server may be utilized to monitor the proper functioning of the software agents.

In the context of the present invention, one or more software agents (whether local or remote) may be used to help distribute a large payout in order to prevent a gaming apparatus from stopping. For example, software agent(s) may monitor for a triggering event such as a large jackpot reward; and thereafter perform the necessary steps to make the payout, and document it to the appropriate agencies. Software agent(s) may also retrieve data and automatically fill out forms required by the agencies. Software agents may for example be employed to request information such as gaming and player data, authenticate player and gaming data, create records, obtain or retrieve forms, complete or fill out the required forms, obtain user verification such as a digital signature, and electronically file the required forms to the appropriate agencies such as the IRS. In some cases, a software agent is configured to perform a single or multiple tasks. In other cases, multiple software agents are configured to perform a single or multiple tasks. For example, different steps may require different software agents. The number and function of software agents typically depends on the desired needs and set up of the gaming apparatus.

In one embodiment, one or more software agents monitor a game for a triggering reward event (e.g., payout that exceeds a certain threshold), pull or obtain the appropriate forms, marries the forms with player tracking information (e.g., obtained from a player tracking card), authenticates the machine code, verifies the win and electronically files the forms.

In one example, when a high reward is won, a software agent records the event, obtains player information stored at the gaming apparatus as part of a player tracking card; authenticates the player, obtains gaming data from the gaming apparatus in order to authenticate the code and verify the win; obtains forms or jurisdictional rules from a local host program and/or from a remote server; fills out the required forms, obtains a digital signature from the user, completes the forms using the digital signature, stores the completed forms (locally and/or remotely) and electronically files the completed form.

While this invention has been described in terms of several preferred embodiments, there are alterations, permutations, and equivalents, which fall within the scope of this invention. For example, although primarily directed at gaming machines, it should be appreciated that the inventions described above may also be applied to other suitable gaming situations including table games, online games, games played on personal computers or PDAs, and the like. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method comprising:
   determining a location where game play of a game provided by a gaming apparatus is occurring;
   determining one or more jurisdictions corresponding to the location;
   determining a predetermined amount associated with tax regulations for at least one of the one or more jurisdictions determined to correspond to the determined location where the game play is occurring, the predetermined amount indicating that payout of an award exceeding the predetermined amount is required to be documented pursuant to the tax regulations of the at least one of the one or more jurisdictions;
   providing for the game play of the game provided by the gaming apparatus in accordance with inputs of a player, wherein the gaming apparatus is configured to provide payouts of won awards resulting from the game play via either a first payout procedure or a second payout procedure, wherein the second payout procedure includes documenting the payout of an award pursuant to the tax regulations of the at least one of the one or more jurisdictions with minimal interruption of a gaming session;
   monitoring the game play for an amount of a won award;
   determining if the amount of the won award exceeds the predetermined amount, implementing the second payout procedure when the amount of the won award is determined to exceed the predetermined amount.

2. The method as recited in claim 1, wherein the second payout procedure includes printing out a ticket or a voucher that is only redeemable at physical cashier locations in an amount of the payout, and thereafter automatically resetting the gaming apparatus for play with an amount of credits not including credits from the payout.

3. The method as recited in claim 1, wherein the second payout procedure includes storing the payout on the gaming apparatus separately from credits available for wagering until the gaming session ends.

4. The method as recited in claim 1, wherein the second payout procedure includes outputting the payout when the game play session ends.

5. The method as recited in claim 1, wherein the second payout procedure includes outputting the payout immediately after the won award is won.

6. The method as recited in claim 1, wherein the second payout procedure includes obtaining player identification information, notifying a host system that the won award has been won, and resetting any credits available for wagering to include the payout.

7. The method of claim 6, wherein the player identification information is obtained from a player tracking system.

8. The method as recited in claim 1, wherein the second payout procedure includes obtaining player identification information, storing the payout in an account assigned to a player, and resetting any credits available for wagering on the gaming apparatus to an amount of credits not including any credits from the payout.

9. The method as recited in claim 1, wherein the second payout procedure includes capturing an indicium of a player.

10. The method as recited in claim 9, wherein the indicium is a signature of the player.

11. The method as recited in claim 9, wherein the indicium is a picture of the player.

12. The method as recited in claim 1, wherein the gaming apparatus is at a location outside a gaming operator's property.

13. The method as recited in claim 1, wherein the gaming apparatus is at a location within a gaming operator's property.

14. The method as recited in claim 1, wherein the gaming apparatus is a gaming device including a gaming machine or a portable game player.

15. The method as recited in claim 1, wherein the gaming apparatus is a gaming table.

16. The method as recited in claim 1, wherein the gaming apparatus is a PDA.

17. The method as recited in claim 1, wherein the gaming apparatus is a personal computer.

18. The method as recited in claim 17, wherein the personal computer is located within a player's home.

19. The method as recited in claim 1, wherein the game is played online.

20. The method as recited in claim 1, wherein the step of monitoring is performed by a software agent.

21. A method comprising:
determining a location where game play of a game provided by a gaming machine is occurring, wherein the gaming machine is configured to provide payouts resulting from the game play via either a first payout procedure or a second payout procedure, wherein the second payout procedure includes documenting a payout of an award pursuant to tax regulations of at least one of one or more jurisdictions with minimal interruption of a gaming session;
determining the one or more jurisdictions corresponding to the location;
determining a predetermined threshold associated with the tax regulations for at least one of the one or more jurisdictions determined to correspond to the determined location where the game play is occurring, the predetermined threshold indicating that payout of an award exceeding the predetermined threshold is required to be documented pursuant to the tax regulations of the at least one of the one or more jurisdictions;
monitoring for a payout on the gaming machine that exceeds the predetermined threshold;
transferring a value of the payout exceeding the predetermined threshold from the gaming apparatus to a removable storage medium; and
resetting the gaming apparatus to an amount of credits not including any credits from the payout in order to allow the gaming session to continue without interruption.

22. The method as recited in claim 21, wherein the removable storage medium is a ticket that is printed at the gaming apparatus.

23. The method as recited in claim 21, wherein the removable storage medium is flash memory.

24. The method as recited in claim 21, wherein the removable storage medium is a USB key.

25. The method as recited in claim 21, wherein the removable storage medium is a smart card.

26. The method as recited in claim 21, wherein the removable storage medium is a swipeable card.

27. The method as recited in claim 26, wherein the swipeable card is a player tracking card.

28. The method as recited in claim 21, further comprising:
recording an indicium of the player at a time when the payout is won.

29. The method as recited in claim 28, wherein the indicium is a signature.

30. The method as recited in claim 28, wherein the indicium is a picture.

31. The method as recited in claim 28, wherein the the recording of the indicium is transferred to the removable storage medium.

32. The method as recited in claim 21, further comprising:
obtaining information about a player before or at a time when the payout is won.

33. The method as recited in claim 21, wherein at least one of the steps is performed by a software agent.

34. The method as recited in claim 33, wherein at least the step of monitoring is performed by a software agent.

35. A method comprising:
determining a location where a gaming session on a gaming apparatus is occurring, wherein the gaming apparatus is configured to provide payouts resulting from the gaming session via either a first payout procedure or a second payout procedure, wherein the second payout procedure includes documenting a payout of an award pursuant to tax regulations of at least one of one or more jurisdictions with minimal interruption of the gaming session;
determining the one or more jurisdictions corresponding to the location;
determining a predetermined threshold associated with the tax regulations for at least one of the one or more jurisdictions determined to correspond to the determined location where the gaming session is occurring, the predetermined threshold indicating that payout of an award exceeding the predetermined threshold is required to be documented pursuant to the tax regulations of the at least one of the one or more jurisdictions;
monitoring for a payout during the gaming session that exceeds the predetermined threshold; and
when the payout exceeds the predetermined threshold, obtaining player data,
obtaining gaming data at the time of the payout,
creating and storing a record linking the gaming data and the player data, and
resetting a credit meter of a gaming machine when the record has been made.

36. The method as recited in claim 35, further comprising authenticating the player data.

37. The method as recited in claim 35, further comprising authenticating the gaming data.

38. The method as recited in claim 35, further comprising authenticating the gaming machine and software associated with the gaming machine.

39. The method as recited in claim 35, wherein the credit meter is reset to include the payout with an amount of credits available for wagering on the gaming machine.

40. The method as recited in claim 35, further comprising verifying that the record was stored.

41. The method as recited in claim 35, further comprising issuing a receipt.

42. The method as recited in claim 41, wherein the receipt is a physical receipt or an electronic receipt.

43. The method as recited in claim 35, wherein at least one of the steps is performed by a software agent.

44. The method as recited in claim 43, wherein at least the step of monitoring is performed by the software agent.

45. The method as recited in claim 35, wherein at least two of the steps are performed by one or more software agents.

46. The method as recited in claim 45, wherein each step performed by a software agent is performed by a different software agent.

47. A method comprising:
determining a location where game play of a wagering game is occurring on a gaming device, wherein the gaming device is configured to provide payouts resulting from the game play via either a first payout procedure or a second payout procedure, wherein the second payout procedure includes documenting the payout of an award pursuant to the tax regulations of the at least one of the one or more jurisdictions with minimal interruption of a gaming session;
determining the one or more jurisdictions corresponding to the location;
determining a predetermined threshold associated with the tax regulations for at least one of the one or more jurisdictions determined to correspond to the determined location where the game play is occurring, the predetermined threshold indicating that payout of an award exceeding the predetermined threshold requires tax reporting forms of the at least one of the one or more jurisdictions to be submitted to one or more regulatory or governmental entities associated with the at least one of the one or more jurisdictions pursuant to the tax regulations of the at least one of the one or more jurisdictions;
monitoring the wagering game for the win of a large award, the large award in an amount exceeding the predetermined threshold;
receiving gaming data and player data associated with the large award;
populating the tax reporting forms using the gaming data and the player data;
obtaining a digital signature from a player associated with the win of the large award;
associating the digital signature with the tax reporting forms; and
electronically filing the populated tax reporting forms with the one or more regulatory or governmental entities.

48. The method of claim 47, further comprising verifying the jurisdiction where the game was played and obtaining jurisdiction data on the jurisdiction, and wherein the tax reporting forms are populated using the jurisdictional data, the gaming data, and the player data.

49. The method as recited in claim 47, further comprising issuing a receipt.

50. The method as recited in claim 47, further comprising issuing copies of the filed tax reporting forms physically or electronically to the player.

51. The method as recited in claim 47, further comprising:
determining gambling losses for the player associated with the win of the large award; and
issuing one or more gambling loss statements physically or electronically to the player.

52. The method as recited in claim 47, wherein at least one of the steps is performed by one or more software agents.

53. The method as recited in claim 47, wherein a majority of the steps are performed by one or more software agents.

54. A method comprising:
determining a location where play of a game provided by a gaming apparatus is occurring, wherein the gaming apparatus is configured to provide payouts resulting from the game via either a first payout procedure or a second payout procedure, wherein the second payout procedure includes documenting the payout of an award pursuant to the tax regulations of the at least one of the one or more jurisdictions with minimal interruption of a gaming session;
determining the one or more jurisdictions corresponding to the location;
determining a triggering payout event associated with the tax regulations of at least one of the one or more jurisdictions determined to correspond to the determined location where the play of the game is occurring, the triggering payout event indicating that payout of an award causing the triggering payout event to occur is required to be documented using pursuant to the tax regulations of the at least one of the one or more jurisdictions
monitoring the game for the triggering payout event;
obtaining player tracking information for a player associated with the triggering payout event;
obtaining electronic tax reporting forms associated with the triggering payout event;
populating the electronic tax reporting forms with the player tracking information; and
electronically filing the electronic tax reporting forms at one or more regulatory or governmental agencies as appropriate for the location of the player.

55. The method as recited in claim 54, wherein the game is played on a gaming machine, the method further comprising:
authenticating software code executed by the gaming machine; and
verifying a win associated with the triggering payout event.

56. The method as recited in claim 54 further comprising:
obtaining a signature of the player when the triggering payout event occurs.

57. The method as recited in claim 54, wherein at least one of the steps is performed by a software agent.

58. The method as recited in claim 57, wherein at least the step of monitoring is performed by a software agent.

59. The method as recited in claim 54, wherein at least two of the steps are performed by one or more software agents.

60. The method as recited in claim 59, wherein each step performed by a software agent is performed by a different software agent.

* * * * *